United States Patent [19]

Tsutsui et al.

[11] Patent Number: 5,717,821
[45] Date of Patent: Feb. 10, 1998

[54] METHOD, APPARATUS AND RECORDING MEDIUM FOR CODING OF SEPARATED TONE AND NOISE CHARACTERISTIC SPECTRAL COMPONENTS OF AN ACOUSTIC SIBNAL

[75] Inventors: Kyoya Tsutsui, Kanagawa; Robert Heddle, Tokyo, both of Japan

[73] Assignee: Sony Corporation, Tokyo, Japan

[21] Appl. No.: 374,518

[22] PCT Filed: May 31, 1994

[86] PCT No.: PCT/JP94/00880

§ 371 Date: Mar. 20, 1995

§ 102(e) Date: Mar. 20, 1995

[87] PCT Pub. No.: WO94/28633

PCT Pub. Date: Dec. 8, 1994

[30] Foreign Application Priority Data

May 31, 1993 [JP] Japan ..................... 5-152865

[51] Int. Cl.$^6$ ..................................... G10L 7/02
[52] U.S. Cl. .............. 395/2.14; 395/2.15; 395/2.17; 395/2.67; 395/2.77
[58] Field of Search ..................... 395/2.14, 2.15, 395/2.17, 2.29, 2.67, 2.77; 381/41, 51

[56] References Cited

U.S. PATENT DOCUMENTS

| | | | |
|---|---|---|---|
| 3,973,081 | 8/1976 | Hutchins | 395/2.39 |
| 4,184,049 | 1/1980 | Crochiere et al. | 395/2.38 |
| 4,455,649 | 6/1984 | Esteban et al. | 370/522 |
| 4,535,472 | 8/1985 | Tomcik | 395/2.38 |
| 4,748,579 | 5/1988 | Zibman et al. | 364/726 |
| 4,827,336 | 5/1989 | Acampora et al. | 348/396 |
| 4,896,362 | 1/1990 | Veldhuis et al. | 395/2.38 |
| 4,912,763 | 3/1990 | Galand et al. | 395/2.39 |
| 4,932,062 | 6/1990 | Hamilton | 395/2.42 |

(List continued on next page.)

FOREIGN PATENT DOCUMENTS

| | | | |
|---|---|---|---|
| 0 145 788 A1 | 6/1985 | European Pat. Off. | H04B 12/02 |
| 0 255 111 A2 | 2/1988 | European Pat. Off. | G11B 20/10 |
| 0 289 080 A1 | 11/1988 | European Pat. Off. | H04B 1/66 |
| 0 338 781 A2 | 10/1989 | European Pat. Off. | G11B 20/18 |
| 0 348 132 A2 | 12/1989 | European Pat. Off. | G11B 20/18 |
| 0 420 745 A2 | 9/1990 | European Pat. Off. | H04B 1/66 |
| 0 421 259 A2 | 9/1990 | European Pat. Off. | H04B 1/66 |
| 0 409 248 A2 | 1/1991 | European Pat. Off. | H03M 7/36 |
| 0 424 016 A2 | 4/1991 | European Pat. Off. | H04B 1/66 |

(List continued on next page.)

OTHER PUBLICATIONS

1990 International Conference on Acoustics, Speech and Signal Processing, Albuquerque, New Mexico, 3d–6th Apr. 1990), vol. 2, pp. 1093–1096, IEEE New York, A. Sugiyama et al. Adaptive transform coding with an adaptive block size (ATC-ABS).

Frequenz, vol. 43, No. 9, Sep. 1989, pp. 252–256, Berlin, DE; B. Edler: "Codierung von Audiosignalen mit überlappender Transformation und adaptiven Fensterfunktionen" (Paragraph 4: Steuerung der Fensteradaption.

K. Brandenburg, et al, "ASPEC: Adaptive Spectral Perceptual Entropy Coding of High Quality Music Signals," AES, 90th Convention 1991 Feb. 19–22, Paris, pp. 1–10 and FIGS. 1 and 2.

(List continued on next page.)

Primary Examiner—Allen R. MacDonald
Assistant Examiner—Tālivaldis Ivars Šmits
Attorney, Agent, or Firm—Limbach & Limbach L.L.P.

[57] ABSTRACT

A method, and the apparatus for its implementation, for encoding an input signal includes the steps of transforming an input signal into frequency components, as for example by spectrum transform processing, separating the frequency components into a first signal consisting of tone characteristic components and a second signal consisting of other components, encoding the first signal, and encoding a signal based on the second signal.

62 Claims, 15 Drawing Sheets

U.S. PATENT DOCUMENTS

| | | | |
|---|---|---|---|
| 4,972,484 | 11/1990 | Theile et al. | 395/2.36 |
| 5,049,992 | 9/1991 | Citta et al. | 348/443 |
| 5,081,681 | 1/1992 | Hardwick et al. | 395/2.77 |
| 5,109,417 | 4/1992 | Fielder et al. | 395/2.14 |
| 5,115,240 | 5/1992 | Fujiwara et al. | 341/51 |
| 5,117,228 | 5/1992 | Fuchigami et al. | 341/200 |
| 5,134,475 | 7/1992 | Johnston et al. | 348/415 |
| 5,142,656 | 8/1992 | Fielder et al. | 395/2.38 |
| 5,151,941 | 9/1992 | Nishiguchi et al. | 395/2.42 |
| 5,157,760 | 10/1992 | Akagiri | 395/2.42 |
| 5,166,686 | 11/1992 | Sugiyamama | 341/155 |
| 5,185,800 | 2/1993 | Mahieux | 395/2.91 |
| 5,222,189 | 6/1993 | Fielder | 395/2.38 |
| 5,226,084 | 7/1993 | Hardwick et al. | 395/2.28 |
| 5,243,588 | 9/1993 | Maeda et al. | 369/54 |
| 5,244,705 | 9/1993 | Tsurushima et al. | 428/64.4 |
| 5,285,476 | 2/1994 | Akagiri et al. | 375/25 |
| 5,294,925 | 3/1994 | Akagiri | 341/50 |
| 5,301,205 | 4/1994 | Tsutsui et al. | 375/200 |
| 5,311,561 | 5/1994 | Akagiri | 375/240 |
| 5,367,608 | 11/1994 | Veldhuis et al. | 395/2.38 |
| 5,375,189 | 12/1994 | Tsutsui | 395/2.38 |
| 5,381,143 | 1/1995 | Shimoyoshi et al. | 341/51 |
| 5,388,209 | 2/1995 | Akagiri | 395/2.38 |
| 5,416,604 | 5/1995 | Park | 358/433 |
| 5,438,643 | 8/1995 | Akagiri et al. | 395/2.1 |

FOREIGN PATENT DOCUMENTS

| | | | |
|---|---|---|---|
| 0 428 156 A2 | 5/1991 | European Pat. Off. | H03M 7/30 |
| 0 506 394 A2 | 9/1992 | European Pat. Off. | G10L 7/00 |
| 0 525 809 A2 | 2/1993 | European Pat. Off. | H04B 1/66 |
| 0525809 A2 | 2/1993 | European Pat. Off. | H04B 1/66 |
| 0 516 342 A3 | 12/1993 | European Pat. Off. | G11B 27/00 |
| 63-110830 | 5/1988 | Japan | H04B 14/06 |
| 3-109824 | 5/1991 | Japan | H03M 7/30 |
| 3-117919 | 5/1991 | Japan | H03M 7/30 |
| 3-132217 | 6/1991 | Japan | H03M 7/30 |
| 3-139922 | 6/1991 | Japan | H03M 7/30 |
| 3-256411 | 11/1991 | Japan | H03M 7/30 |
| 3-263925 | 11/1991 | Japan | H03M 7/30 |
| 5-114888 | 5/1993 | Japan | H04B 14/06 |
| 6-29934 | 2/1994 | Japan | H04B 14/06 |
| 6-149292 | 5/1994 | Japan | G10L 9/08 |

OTHER PUBLICATIONS

G. Davidson, et al., "Low–Complexity Transform Coder for Satellite Link Applications," AES, 89th Convention 1990 Sep. 21–25 Los Angeles, pp. 1–22.

J. D. Johnston, "Transform Coding of Audio Signals Using Perceptual Noise Criteria," IEEE Journal on Selected Areas in Communication, vol. 6, No. 2, Feb. 1988, pp. 314–323.

E.F. Schröder, et al., "High Quality Digital Audio Encoding with 3.0 Bits/Sample using Adaptive Transform Coding," AES, 80th Convention 1986 Mar. 4–7 Montreux, Switzerland, pp. 1–7.

D. Esteban, et al., "Application of Quadrature Mirror Filters to Split Band Voice Coding Schemes," 1977 IEEE International Conference on Acoustics, Speech & Signal Processing, pp. 191–195.

G. Stoll, et al., "Masking–Pattern Adapted Subband Coding: Use of the Dynamic Bit–Rate Margin," AES, 8th Conference 199 Mar. 1–4 Paris, pp. 1–33.

G. Theile, et al., "Low bit–rate coding of high–quality audio signals—An introduction to the MASCAM system," EBY Review/Technical, 1988 Aug., No. 230, Brussels, Belgium, pp. 158–181.

Y. Mahieux, et al., "Transform Coding of Audio Signals at 64 Kbit/s," 1990 IEEE, Globecom '90, IEEE Global Telecommunications Conference & Exhibit, pp. 0518–0522.

M. Krasner, "The Critical Band Coder—Digital Encoding of Speech Signals Based on the Perceptual Requirements of the Auditory System," Apr. 1980 IEEE, vol. 1–3, pp. 327–331.

R. Zelinski et al., "Adaptive Transform Coding of Speech Signals," IEEE Transactions on Acoustics, Speech & Signal Processing, vol. ASSP–25, No. 4, Aug. 1977, pp. 299–309.

J. Princen et al., "Subband/Transform Coding Using Filter Bank Designs Based on Time Domain Aliasing Cancellation," ICASSP Apr. 6–9 1987, IEEE, vol. 4, pp. 2161–2164.

J. Rothweiler, "Polyphase Quadrature Filters—A New Subband Coding Technique," ICASSP Apr. 14–16 1983, vol. 3 of 3, pp. 1280–1283.

R. Crochiere et al, "Digital Coding of Speech in Sub–Bands," The Bell System Technical Journal, vol. 55, No. 8, Oct. 1976, pp. 1069–1085.

Daniel W. Griffin and Jae S. Lim, "A High Quality 9.6 kbps Speech Coding System", Proc. IEEE ICASSP '86, pp. 125–128, Apr. 1986.

Daniel W. Griffin and Jae S. Lim, "Multiband Excitation Vocoder", IEEE Trans. Acoustics, Speech, and Signal Processing, vol. 36, No. 8, pp. 1223–1235, Aug. 1988.

Paul C. Meuse, "A 2400 bps Multi–Band Excitation Vocoder",Proc. IEEE ICASSP '90, session S1.3, pp. 9–12, Apr. 1990.

M. S. Torres–Guijarro and F. J. Casajus–Quiros, "Improved Analysis/Synthesis Methods for the Multiband Excitation Coder", Proc. IEEE Mediterranean Electrotechnical Conference, pp. 57–60, Apr. 1994.

METHOD, APPARATUS AND RECORDING MEDIUM FOR CODING OF SEPARATED TONE AND NOISE CHARACTERISTIC SPECTRAL COMPONENTS OF AN ACOUSTIC SIBNAL

TECHNICAL FIELD

This invention relates to a signal encoding apparatus and a signal encoding method to which there is applied such a system of encoding information such as digital data, etc. to carry out encoding of input digital data by so called efficient encoding to transmit and record encoded data; a decoding apparatus and a decoding method to which there is applied such a system of decoding information such as digital encoded data, etc. to decode encoded data obtained by reproduction or transmission to provide reproduced signals; and a recording medium on which signals encoded by such encoding apparatus or method are recorded.

Background Art

Hitherto, there are various efficient encoding techniques for audio signals or speech signals, etc. For example, there can be enumerated band division coding (Sub Band Coding (SBC)) which is a non-blocking frequency band division system to divide an audio signal, etc. on a time base into signal components in a plurality of frequency bands for every predetermined unit time without implementing blocking thereto to encode them; so called transform coding which is a blocking frequency band division system to divide a signal on a time base into blocks for every predetermined unit time to transform respective signals on a time base into signals on the frequency base every respective block (spectrum transform processing) to divide signals transformed in this way into signal components in a plurality of frequency bands to encode them for every respective frequency band, and the like. Moreover, there has been also already proposed efficient coding techniques in which the band division coding and the transform coding described above are combined. In this case, for example, a signal on a time base is divided into signals in a plurality of bands by the above-mentioned band division coding thereafter to spectrum-transform the signals for every respective band into signals on frequency base to implement coding to the spectrum-transformed signals for every respective band.

Here, as filter for band division used in the above-mentioned band division coding technique, or the above-mentioned combined efficient coding technique, etc., there is a filter, QMF, etc. Such a filter is described in 1976 R. E. Crochiere Digital coding of speech in subbands Bell Syst. Tech. J. Vol. 55, No. 8 1976. Moreover, a filter division technique of equal bandwidth is described in ICASSP 83, BOSTON Polyphase Quadrature filters—A new subband coding technique Joseph H. Rothweiler.

Further, as the above-described spectrum transform processing, there is, such a spectrum transform processing to divide an input audio signal into blocks for every predetermined unit time (frame) to carry out Discrete Fourier Transform (DFT), Discrete Cosine Transform (DCT) or Modified DCT Transform (MDCT), etc., for every respective block thus to transform signals on the time base into signals on the frequency base. The above-mentioned MDCT is described in ICASSP 1987 Subband/Transform Coding Using Filter Bank Designs Based on Time Domain Aliasing Cancellation J. P. Princen A. B. Bradley Univ. of Surrey Royal Melbourne Inst. of Tech.

By quantizing signals divided for every band by filter or spectrum transform processing in this way, it is possible to control bands where quantizing noises take place, and to carry out more efficient coding from a viewpoint of that hearing sense by making use of the property of the masking effect, etc. Moreover, in this case, when an approach is employed to carry out normalization for every respective band by taking the maximum value of absolute values of signal components in respective corresponding bands prior to implementation of quantization, further efficient coding can be carried out.

Moreover, as a technique for carrying out frequency band division by frequency division width for quantizing respective frequency components divided for every frequency band, there is carried out band division in which the hearing sense characteristic of the human being is taken into consideration. Namely, there are instances where an audio signal is divided into signal components in plural (e.g., 25) bands by a bandwidth such that bandwidth becomes broader accordingly as frequency shifts to a higher frequency band side, which is generally called critical band. In encoding data for every respective band at this time, encoding by predetermined bit allocation is carried out for every respective band, or encoding by adaptive bit allocation is carried out for every respective band. For example, in encoding coefficient data obtained by the above-mentioned MDCT processing by the bit allocation described above, encoding is carried out by adaptive allocation bit numbers with respect to MDCT coefficient data for every respective band obtained by the MDCT processing for every respective block.

For the bit allocation technique, the following two techniques are known. Namely, in IEEE Transactions of Acoustics, Speech, and Signal Processing, vol. ASSP-25, No. 4, August 1977, bit allocation is carried out on the basis of magnitudes of signals for every respective band. In accordance with this system, quantizing noise spectrum becomes flat, and the noise energy becomes minimum. However, since masking effect is not utilized from a viewpoint of the hearing sense, actual noise sense is not optimum. Moreover, in ICASSP 1980 The critical band coder—digital encoding of the perceptual requirements of the auditory system M. A. Kransner MIT, there is described a technique in which the hearing sense masking is utilized to obtain necessary signal-to-noise ratios for every respective band to carry out fixed bit allocation. With this technique, however, since bit allocation is fixed even in the case where characteristic is measured by sine wave input, characteristic value cannot take a good value.

In order to solve these problems, an efficient encoding apparatus in which all bits usable for bit allocation are used in the state divided into bits for fixed bit allocation pattern determined in advance for every respective small block and bits for carrying out bit allocation dependent upon magnitudes of signals of respective blocks to allow its divisional ratio to be dependent upon a signal related to an input signal so that the divisional ratio to bits for the fixed bit allocation pattern becomes greater accordingly as spectrum of the signal becomes more smooth is proposed in EUROPEAN PATENT APPLICATION, Publication number 0 525 809 A 2, Date of publication of application 03. 02. 93 Bulletin 93/05.

In accordance with this method, in the case where energies concentrate on a specific spectrum component like sine wave input, a greater number of bits are allocated to a block including that spectrum component, thereby making it possible to remarkably improve the entire signal-to-noise characteristic. Since the hearing sense of the human being is generally extremely sensitive to signals having a sharp spectrum component, improving the signal-to-noise characteristic by using such a method not only results in improvement in numeric value in measurement, but also is effective in improvement in sound quality from a viewpoint of the hearing sense.

A large number of methods have been proposed in addition to the above-mentioned bit allocation method. If model relating to the hearing sense is caused to be more fine and ability of the encoding apparatus is enhanced, more efficient encoding from a viewpoint of the hearing sense can be made.

A conventional signal encoding apparatus will now be described by using FIG. 18 and figures succeeding thereto. In FIG. 18, acoustic signal waveform, supplied through terminal 100 is transformed into signal frequency components by transform circuit 101. Then, respective components are encoded by signal component encoding circuit 102. Thus, code train is generated by code train generating circuit 103, and is outputted from terminal 104.

An actual configuration of transform circuit 101 of FIG. 18 is shown in FIG. 19. In FIG. 19, signal delivered through terminal 200 (signal through terminal 100 of FIG. 18) is divided into signals in three frequency bands by two stages of band division filters 201, 202. At band division filter 201, signal through terminal 200 is thinned so that it becomes equal to one half. At band division filter 202, one of the signals thinned into one half by the band division filter 201 is further thinned so that it becomes equal to one half (signal of terminal 200 is thinned so that it becomes equal to one fourth). Namely, bandwidth of two signals from band division filter 202 are one fourth of bandwidth of signal from terminal 200.

Signals of respective bands divided into three bands as described above by these band division filters 201, 202 are caused to be spectrum signal components by spectrum transform circuits 203, 204, 205 for carrying out spectrum transform processing such as MDCT, etc. Outputs of these spectrum transform circuits 203, 204, 205 are sent to the above-mentioned signal component encoding circuit 102 of FIG. 18.

An actual configuration of signal component encoding circuit 102 of FIG. 18 is shown in FIG. 20.

In FIG. 20, output from the signal component encoding circuit 102 delivered to terminal 300 is caused to undergo normalization for every predetermined band by normalizing circuit 201, and is then sent to quantizing circuit 303. Moreover, signal delivered to the terminal 300 is sent also to quantization accuracy determining circuit 302.

At the quantizing circuit 303, quantization is implemented to signal from the normalizing circuit 301 on the basis of quantization accuracy calculated by quantization accuracy determining circuit 303 from signal through the terminal 300. Output from the quantizing circuit 303 is outputted from terminal 304, and is sent to code train generating circuit 103 of FIG. 18. In output signal from the terminal 304, normalization coefficient information in the normalizing circuit 301 and quantization accuracy information in the quantization accuracy determining circuit 302 are included in addition to signal components quantized by the quantizing circuit 303.

An outline of the configuration of a decoding apparatus adapted for decoding an acoustic signal from code trains generated by the encoding apparatus of the structure of FIG. 18 to output the decoded signal is shown in FIG. 21.

In FIG. 21, codes of respective signal components are extracted by code train decomposing circuit 401 from code train generated by the configuration of FIG. 18, which is supplied through terminal 400. Respective signal components are restored (reconstructed) by signal component decoding circuit 402 from those codes. Thereafter, inverse transform processing corresponding to transform processing of the transform circuit 101 of FIG. 18 is implemented by inverse transform circuit 403. Thus, an acoustic waveform signal is obtained. This acoustic waveform signal is outputted from terminal 404.

An actual configuration of inverse transform circuit 403 of FIG. 21 is shown in FIG. 22.

The configuration of FIG. 21 corresponds to the example of configuration of the transform circuit shown in FIG. 19. Signals delivered from signal component decoding circuit 402 through terminals 501, 502, 503 are transformed by inverse spectrum transform circuits 504, 505, 506 for carrying out inverse spectrum transform processing corresponding to the spectrum transform processing in FIG. 19, respectively. Signals of respective bands obtained by these inverse spectrum transform circuits 504, 505, 506 are synthesized by two stages of band synthesis filters 507, 508.

Namely, outputs of inverse spectrum transform circuits 505 and 506 are sent to band synthesis filter 507, at which they are synthesized. Further, output of the band synthesis filter 507 and output of the inverse spectrum transform circuit 504 are synthesized by band synthesis filter 508. Output of this band synthesis filter 508 is outputted from terminal 509 (terminal 404 of FIG. 21).

FIG. 23 is a view for explaining an encoding method conventionally carried out in the encoding apparatus shown in FIG. 18. In the example of FIG. 23, spectrum signal is a signal obtained by transform circuit of FIG. 19. FIG. 23 shows levels of absolute values of spectrum signals (signal components) by MDCT in terms of dB values.

In FIG. 23, input signal is transformed into 64 spectrum signals every predetermined time block. Those spectrum signals are combined into groups (hereinafter referred to as encoding units) every five predetermined bands indicated by bi to b5 in FIG. 23, and are caused to undergo normalization and quantization. In this example, bandwidth of respective encoding units are caused to be narrow on the lower frequency band side and are broad on the higher frequency band side so that control of occurrence of quantizing noise in correspondence with the property of the hearing sense can be conducted.

However, in the above-described method conventionally used, bands where frequency components are quantized are fixed. For this reason, in the case where spectrum components concentrate on the portions in the vicinity of several specific frequencies, if attempt is made to quantize those spectrum components with sufficient accuracy, many bits must be allocated to a large number of spectrum components belonging to the same band as that of those spectrum components.

Namely, as is clear from the FIG. 23 mentioned above, when normalization is carried out in the state where signals are combined for every predetermined band, normalization coefficient values are normalized on the basis of a great normalization coefficient value determined by tone characteristic component, e.g., in the frequency band of b3 in the figure where tone characteristic component is included in signal.

At this time, noise included in acoustic signal of tone characteristic where energies of spectrum components concentrate on a specific frequency or frequencies is generally very offensive to the ear as compared to noise applied to acoustic signal where energies are gently distributed over a broad frequency band and is therefore a great obstacle from a viewpoint of the hearing sense. Further, if spectrum components having great energy, i.e., tone characteristic components are not quantized with sufficiently good accuracy, in the case where those spectrum components are caused to be waveform signals on a time base for a second time to synthesize them with blocks before and after, distortion between blocks becomes great (great connection distortion takes place when synthesized with waveform signals of adjacent time blocks), so there also results a great obstacle from a viewpoint of the hearing sense. For this reason, for encoding of tone characteristic components, quantization must be carried out by a sufficiently large number of bits. However, in the case where quantization accuracies are determined for every predetermined frequency band as described above, it is necessary to allocate many bits to a large number of spectrum components within encoding units including tone characteristic components to carry out quantization thereof, resulting in poor encoding efficiency. Accordingly, it was conventionally difficult to improve efficiency of encoding without deteriorating sound quality particularly with respect to acoustic signals of tone characteristic.

With the above in view, an object of this invention is to provide a signal encoding apparatus and a signal encoding method which can improve efficiency of encoding without deteriorating sound quality particularly with respect to acoustic signals of tone characteristic, a recording medium on which signals processed by such signal encoding apparatus or method are recorded, and a signal decoding apparatus and a signal decoding method for decoding encoded signals reproduced from such a recording medium or transmitted from such a signal encoding apparatus.

Disclosure of the Invention

A signal encoding method for an input signal according to this invention comprises the steps of transforming an input signal into frequency components, separating the frequency components into a first signal consisting of tone characteristic components and a second signal consisting of other components, encoding the first signal, and encoding a signal based on the second signal.

In the signal encoding method of this invention, the above-mentioned transform processing is spectrum transform processing and encodes position information on the frequency base of the tone characteristic component, or encodes numeric information within a predetermined range of the tone characteristic components. Moreover, the signal based on the second signal is a signal in which a signal of an encoding unit including the principal portion of tone characteristic components of the first signal of frequency components is caused to be zero, or a signal in which the first signal and neighboring frequency components thereof of the frequency components are caused to be zero. Further, the step of separation includes a step of encoding the tone characteristic component, decoding the encoded tone characteristic component, and subtracting the decoded tone characteristic component from any frequency component of the input signal to generate a difference signal, with the second signal as the difference signal. The step of encoding of the signal includes a step of normalizing an inputted signal for every encoding unit to quantize the normalized signals. Also, the step of encoding of the signal includes a step of implementing variable length coding (encoding) to an inputted signal. The step of separation separates the first signal only from a higher frequency band of the frequency components. The step of transform processing carries out transform processing so that frequency resolution on a lower frequency band side is higher than frequency resolution on a higher frequency band side. In this case, the above-mentioned input signal is a speech signal. Moreover, the above-mentioned position information includes information indicating differences between position information of the current block and position information of any other time block. The number of frequency components caused to be zero with respect to respective frequency components of the first signal is such that the number of such frequency components on the higher frequency band side is greater than that on the lower frequency band side. The number of frequency components caused to be zero with respect to one frequency component of the first signal is asymmetric with respect to the higher frequency band side and the lower frequency band side with one frequency component of the first signal being a center. The step of separation at least once includes a step of encoding tone characteristic component of the difference signal to decode the encoded tone characteristic component to subtract the decoded tone characteristic component from the difference signal to generate a new difference signal to allow the new difference signal to be the difference signal, having the second signal as the new difference signal.

An encoding apparatus for encoding an input signal of this invention includes means for transforming the input signal into frequency components, means for separating the frequency components into a first signal consisting of tone characteristic components and a second signal consisting of other components, first encoding means for encoding the first signal, and second encoding means for encoding a signal based on the second signal.

Here, in the signal encoding apparatus of this invention, the above-mentioned transform processing is spectrum transform processing. This signal encoding apparatus includes position information encoding means for encoding position information on the frequency base of the tone characteristic component, or encoding means for encoding numeric information within a predetermined range of the tone characteristic component. The signal based on the second signal is a signal in which the signal of encoding unit including the principal portion of the tone characteristic components of the first signal of the frequency components is caused to be zero, or a signal in which the first signal and the neighboring frequency components thereof of the frequency components are caused to be zero. The above-mentioned separating means includes encoding means for encoding the tone characteristic component, decoding means for decoding the encoded tone characteristic component, and means for subtracting the decoded tone characteristic component from any frequency component of the input signal to generate a difference signal, with the above-mentioned second signal as the difference signal. At least the second encoding means of the first-encoding means and the second encoding means includes normalizing means for normalizing the inputted signal for every encoding unit, and quantizing means for quantizing the normalized signals. At least the second encoding means of the first encoding means and the second encoding means includes variable length encoding means for implementing variable length encoding to an inputted signal. The above-mentioned separating means separates the first signal only from the higher frequency band of the frequency components. The above-mentioned transform means carries out transform processing so that frequency resolution on the lower frequency band side is higher than frequency resolution on the higher frequency band side. The above-mentioned input signal is a speech signal. The above-mentioned position information includes information indicating differences between position information of the current block and position information of any other time block. The number of frequency components caused to be zero with respect to respective frequency components of the first signal is such that the number of such frequency components on the higher frequency band side is greater than that on the lower frequency band side. The number of frequency components caused to be zero with respect to one frequency component of the first signal is asymmetric with respect to the higher frequency band side and the lower frequency band side with one frequency component of the first signal being a center. The above-mentioned separating means includes encoding means for encoding tone characteristic component of the difference signal, decoding means for decoding the encoded tone characteristic component, and means for subtracting the decoded tone characteristic component from the difference signal to generate a new difference signal to output the new difference signal as the difference signal, having the above-mentioned second signal as the new difference signal.

A signal recording medium on which encoded signals are recorded by this invention is adapted so that there are recorded thereon encoded first and second signals obtained by transforming an input signal into frequency components to separate the frequency components into a first signal consisting of tone characteristic components and a second signal consisting of other components to encode the first signal based on the second signal.

Here, in the signal recording medium of this invention, the above-mentioned transform processing is spectrum transform processing. Encoded position information on the frequency base of the tone characteristic component is recorded on this signal recording medium. Moreover, encoded numeric information within a predetermined range of the tone characteristic component is recorded on the signal recording medium. The signal based on the second signal is a signal in which the signal of encoding unit including the principal portion of tone characteristic components of the first signal of frequency components is caused to be zero. The signal based on the second signal is a signal in which the first signal and the neighboring frequency components thereof of the frequency components are caused to be zero. The step of separation includes a step of encoding the tone characteristic component to decode the encoded tone characteristic component to subtract the decoded tone characteristic component from any frequency component of the input signal to generate a difference signal, with the above-mentioned second signal as the difference signal. The step of encoding of the signal based on the second signal a step of normalizing an inputted signal for every encoding unit to quantize the normalized signals. Also, the step of encoding of the signal based on the second signal includes a step of implementing variable length coding to an inputted signal. The step of separation separates the first signal only from the higher frequency band of the frequency components. The step of transform processing carries out transform processing so that frequency resolution on the lower frequency band side is greater than frequency resolution on the higher frequency band side. The input signal is a speech signal. The position information includes information indicating differences between position information of current block and position information of any other time block. The number of frequency components caused to be zero with respect to respective frequency components of the first signal is such that the number of such frequency components on the higher frequency band side is greater than that on the lower frequency band side. The number of frequency components caused to be zero with respect to one frequency component of the first signal is asymmetric with respect to the higher frequency band side and the lower frequency band side with one frequency component of the first signal being a center. The step of separation at least once includes a step of encoding tone characteristic component of the difference signal to decode the encoded tone characteristic component to subtract the decoded tone characteristic component from the difference signal to generate a new difference signal to allow the new difference signal to be the difference signal, with the second signal as the new difference signal. Moreover, the signal recording medium on which encoded signals are recorded of this invention is adapted so that tone characteristic component information relating to tone characteristic components and noise characteristic component information relating to noise characteristic components are separately recorded.

Here, in the signal recording medium of this invention, the tone characteristic component information includes position information on the frequency base of the tone characteristic component, or numeric information within a predetermined range of the tone characteristic component. At least the noise characteristic component information of the tone characteristic component information and the noise characteristic information includes normalization coefficient information and quantization accuracy information.

A signal decoding method for encoded a signal of this invention comprises the steps of decoding a first signal consisting of tone characteristic components to generate a first decoded signal, decoding a second signal consisting of noise characteristic components to generate a second decoded signal, and carrying out synthetic inverse transform processing to synthesize the first and second decoded signals to conduct inverse transform processing of the synthesized signal, or synthetic inverse transform processing to respectively inversely transform the first and second decoded signals to synthesize them.

Here, in the signal decoding method of this invention, the step of synthetic inverse transform processing carries out synthesis or inverse transform processing on the basis of position information on the frequency base of the tone characteristic component. Moreover, the signal decoding method of this invention includes a step of carrying out separation between the first signal and the second signal on the basis of numeric information within a predetermined range of the tone characteristic components. The step of generating the second decoded signal carries out inverse quantization and release of normalization with respect to an inputted signal on the basis of normalization information and quantization accuracy information. The encoded signal is a speech signal.

A signal decoding apparatus for an encoded signal of this invention comprises first decoding means for decoding a first signal consisting of tone characteristic components to generate a first decoded signal, second decoding means for decoding a second signal consisting of noise characteristic components to generate a second decoded signal, and synthetic inverse transform means for carrying out synthetic inverse transform processing to synthesize the first and second decoded signals to conduct inverse transform processing of the synthesized signal, or synthetic inverse transform processing to respectively inversely transform the first and second decoded signals to synthesize them.

Here, in the signal decoding apparatus of this invention, the synthetic inverse transform means carries out synthesis or inverse transform processing on the basis of position information on the frequency base of the tone characteristic component. This signal decoding apparatus includes separating means for carrying out separation between the first and second signals on the basis of numeric information within a predetermined range of the tone characteristic components. The first and second decoding means includes means for carrying out inverse quantization and release of normalization with respect to an inputted signal on the basis of normalization information and quantization accuracy information. The encoded signal is a speech signal.

Accordingly, in accordance with this invention, inputted acoustic signal is separated into signal components where energies concentrate on a specific frequency and components where energies are gently distributed over a broad frequency band to implement encoding to those components, thereby making it possible to realize high encoding efficiency.

BEST MODE FOR CARRYING OUT THE INVENTION

Preferred embodiments of this invention will now be described with reference to the attached drawings.

Figure 1:
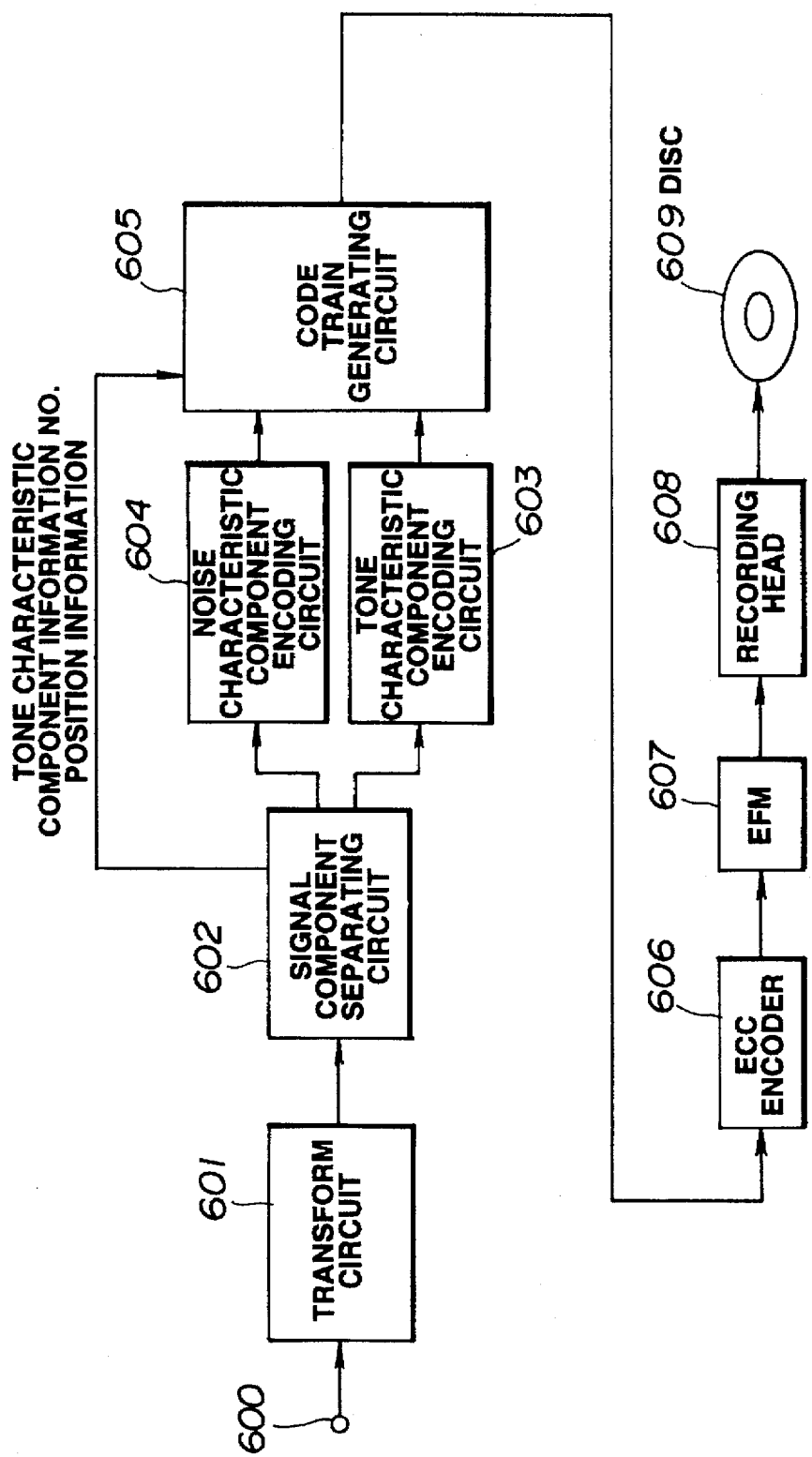
FIG. 1 is a circuit diagram showing, in a block form, outline of the configuration of an encoding apparatus of an embodiment according to this invention.

FIG. 1 shows an outline of the configuration of a signal encoding apparatus of an embodiment according to this invention to which a signal encoding method of this invention is applied.

In FIG. 1, terminal 600 is supplied with an acoustic waveform signal. This acoustic signal waveform is transformed into signal frequency components by transform circuit 601, and is then sent to signal component separating circuit 602.

At this signal component separating circuit 602, signal frequency components obtained by transform circuit 601 are separated into tone characteristic components having sharp spectrum distribution and noise characteristic components having signal frequency components except for the above, i.e., flat spectrum distribution. The tone characteristic components having sharp spectrum distribution of these separated frequency components are encoded by tone characteristic component encoding circuit 603, and the noise characteristic components which are signal frequency components except for the above are encoded by noise characteristic component encoding circuit 604. Outputs from the tone characteristic component encoding circuit 603 and the noise characteristic component encoding circuit 604 are inputted to code train generating circuit 605, at which code train is generated. The code train thus generated is outputted therefrom. ECC encoder 606 adds error correction code to the code train from code train generating circuit 605. Output from ECC encoder 606 is modulated by EFM circuit 607. The modulated signal thus obtained is delivered to recording head 608. This recording head 608 records the code train outputted from EFM circuit 607 onto disc 609. This disc 609 may be a magneto-optical disc or phase change disc. In addition, IC card, etc. may be used in place of disc 609.

Figure 17:
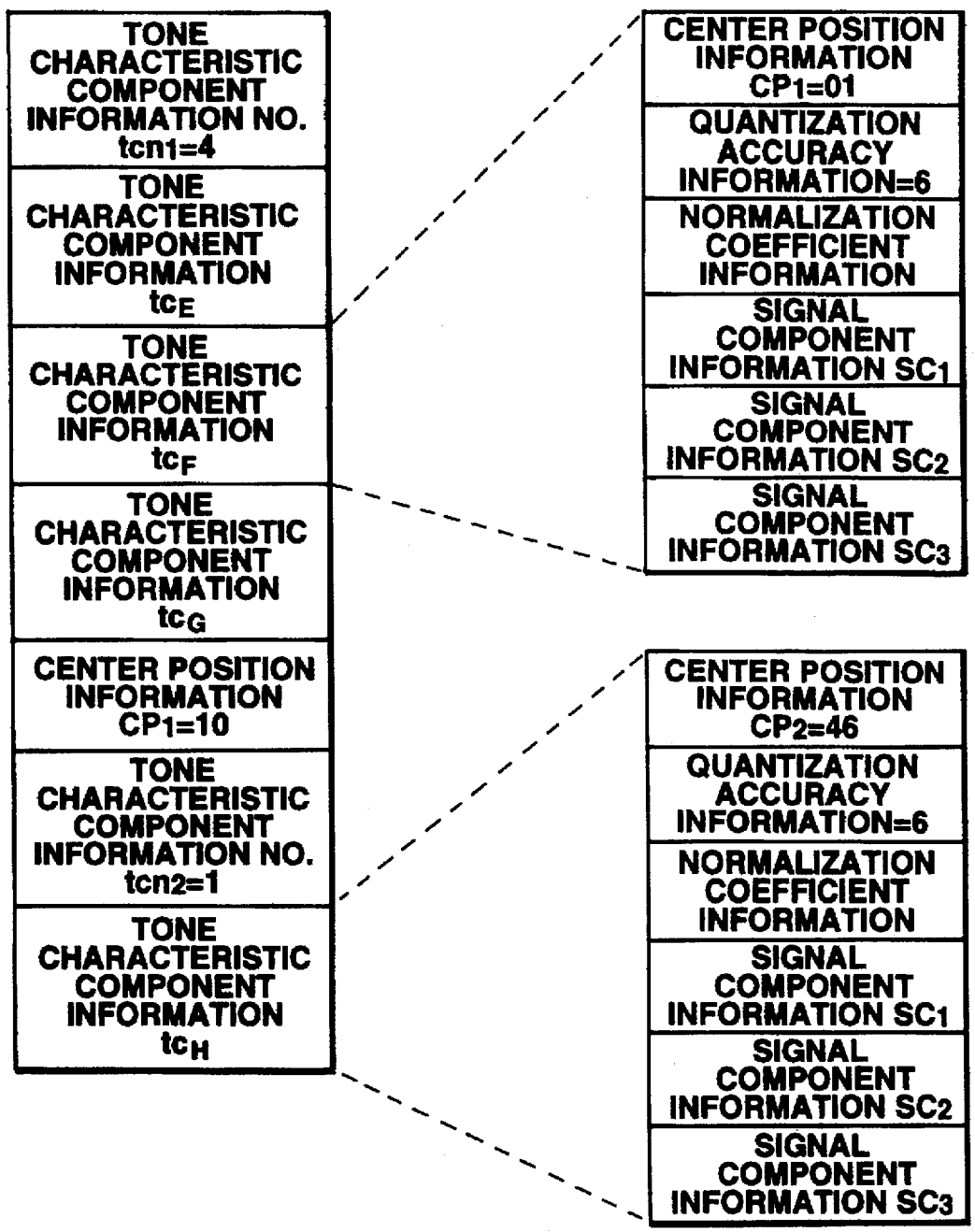
FIG. 17 is a view for explaining recording state in the case where center position information is recorded onto recording medium in this embodiment.

It should be noted that a configuration similar to that of the FIG. 17 mentioned above may be employed as transform circuit 601. Of course, as actual configuration of transform circuit 601 of FIG. 1, a large number of configurations may be conceivable except for the configuration of the FIG. 17 mentioned above. For example, input signal may be directly transformed into spectrum signal by MDCT, and DFT or DCT, etc., may be used as spectrum transform processing in place of MDCT.

Moreover, while the signal may be divided into signals in frequency components by band division filter, since the method of this invention is effectively exerted particularly in the case where energies concentrate on a specific frequency or frequencies, employment of a method of transformation into frequency components by the above-described spectrum transform processing by which a large number of frequency components are obtained by relatively small operation quantity is convenient.

Figure 18:
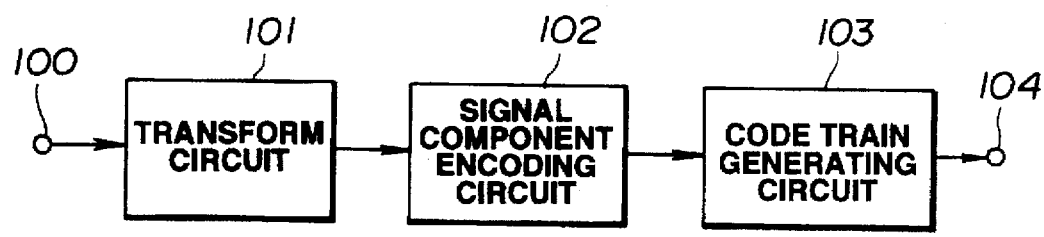
FIG. 18 is a circuit diagram showing, in a block form, outline of the configuration of conventional encoding apparatus.

Further, the tone characteristic component encoding circuit 603 and the noise characteristic component encoding circuit 604 may be fundamentally realized by configuration similar to that of the FIG. 18 mentioned above.

Figure 2:
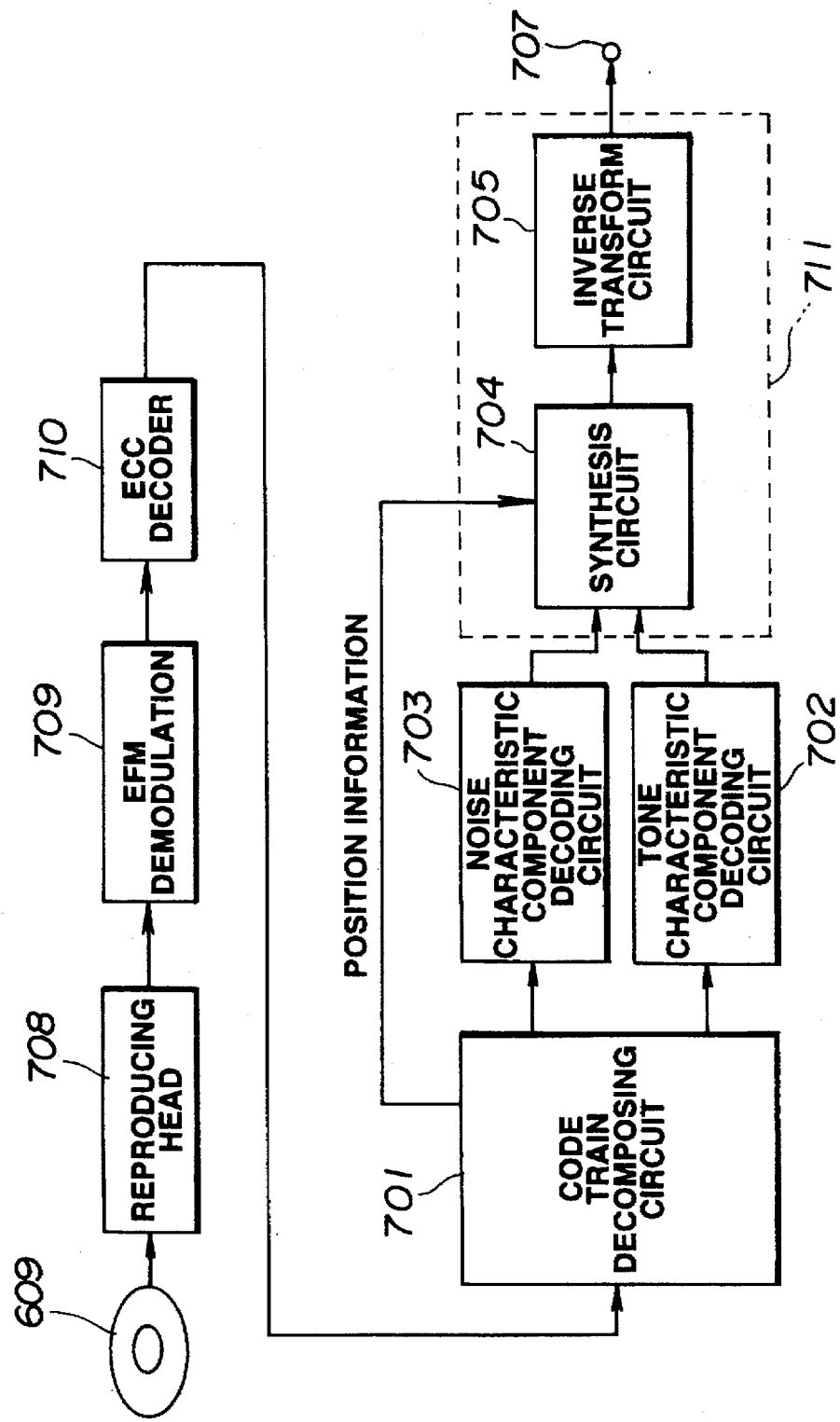
FIG. 2 is a circuit diagram showing, in a block form, outline of the configuration of a decoding apparatus of the embodiment according to this invention.

On the other hand, FIG. 2 shows outline of the configuration of a signal decoding apparatus of the embodiment to which a signal decoding method of this invention for decoding signal encoded by the encoding apparatus of FIG. 1 is applied.

In FIG. 2, code train reproduced through reproducing head 708 from disc 609 is delivered to EFM demodulating circuit 709. This EFM demodulating circuit 709 demodulates inputted code train. The demodulated code train is delivered to ECC decoder 710, at which error correction is carried out. Code train decomposing circuit 701 recognizes, on the basis of tone characteristic component information No., of error-corrected code train, which portion of code train belongs to tone characteristic component code to separate the inputted code train into tone characteristic component codes and the noise characteristic component codes. Moreover, code train separating circuit 701 separates position information of tone characteristic component from the inputted code train to output it to synthesis circuit 704 of the succeeding stage. The tone characteristic component codes are sent to tone characteristic component decoding circuit 702, and the noise characteristic component codes are sent to noise characteristic component decoding circuit 703, at which inverse quantization and release of normalization are respectively carried out and respective components are decoded. Thereafter, decoded signals from tone characteristic component decoding circuit 702 and noise characteristic component decoding circuit 703 are delivered to synthesis circuit 704 for carrying out synthesis corresponding to separation at the signal component separating circuit 602 of FIG. 1. The synthesis circuit 704 adds decoded signal of tone characteristic component to a predetermined position of decoded signal of noise characteristic component on the basis of position information of tone characteristic component delivered from code train separating circuit 701 to thereby carry out synthesis on the frequency base of noise characteristic component and tone characteristic component. Further, the decoded signal thus synthesized is caused to undergo inverse transform processing at inverse transform circuit 705 for carrying out inverse transform processing corresponding to transform processing at the transform circuit 601 of FIG. 1 so that the signal on a frequency base is caused to be an original waveform signal on a time base for a second time. Output waveform signal from the inverse transform circuit 705 is outputted from terminal 707.

It should be noted that the processing order of inverse transformation and synthesis may be opposite to the above.

Figure 3:
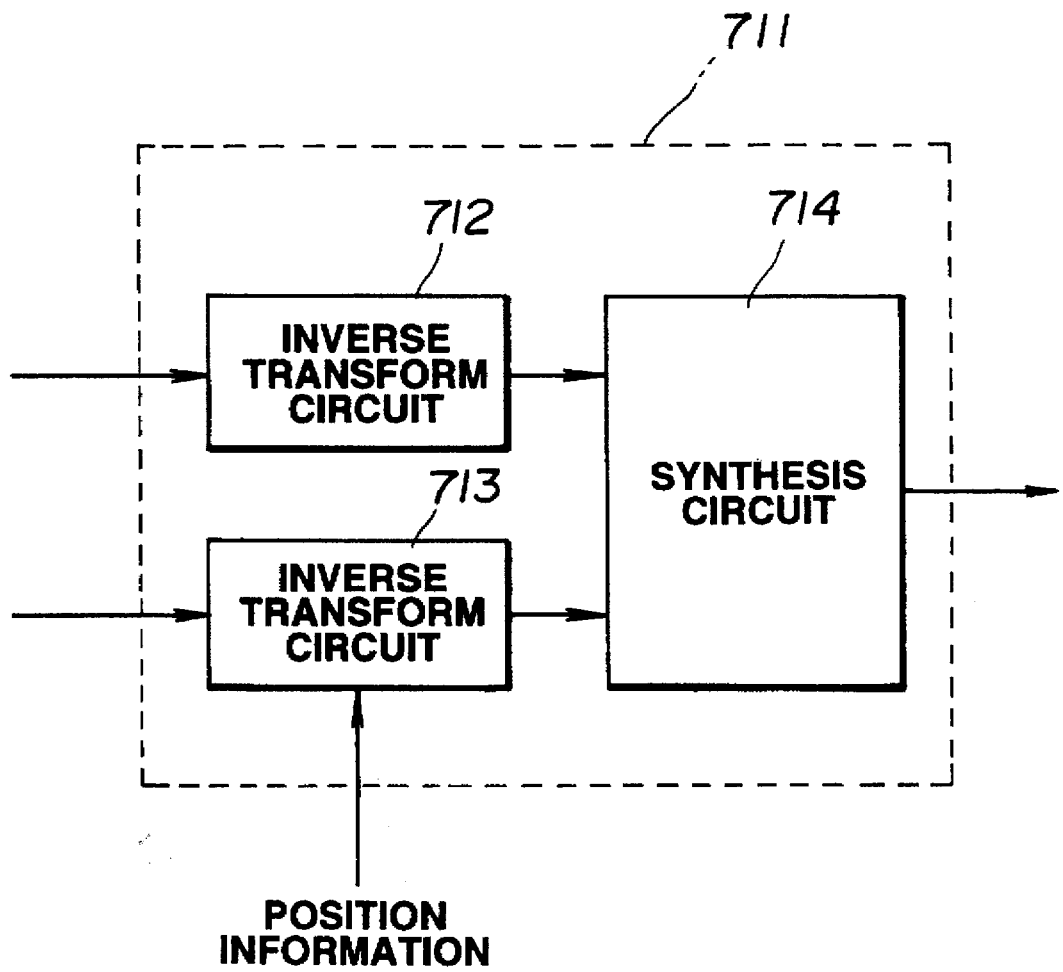
FIG. 3 is a circuit diagram showing, in a block form, the configuration of synthetic inverse transform section.

In this case, synthetic inverse transform section 711 in FIG. 2 is constructed as shown in FIG. 3. In FIG. 3, inverse transform circuit 712 inverse-transforms decoded signal of noise characteristic component on a frequency base from noise characteristic component decoding circuit 703 into noise characteristic component signal on a time base. Inverse transform circuit 713 arranges decoded signal of tone characteristic component from tone characteristic component decoding circuit 702 at a position on the frequency base indicated by position information of tone characteristic component delivered from code train separating circuit 701 to inverse-transform it to generate a tone characteristic component signal on the time base. Synthesis circuit 714 synthesizes noise characteristic component signal on a time base from inverse transform circuit 712 and tone characteristic component signal on the time base from inverse transform circuit 713, thus to generate original waveform signal.

Figure 22:
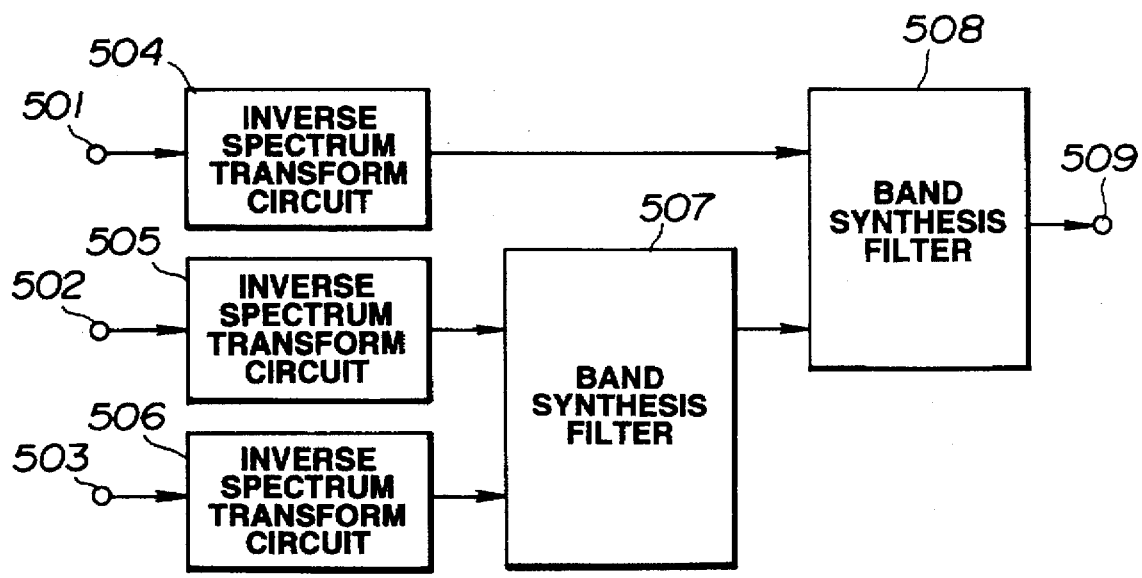
FIG. 22 is a circuit diagram showing, in a block form, actual configuration of inverse transform circuits of this embodiment and conventional decoding apparatus.
Figure 23:
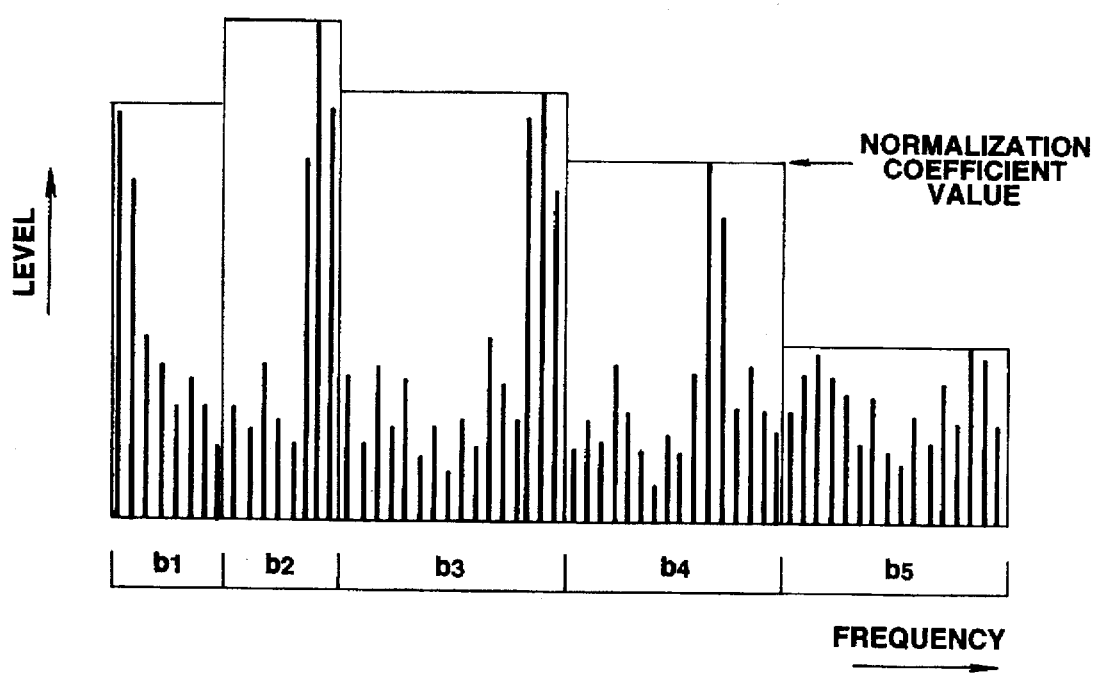
FIG. 23 is a view for explaining encoding method by the prior art.

It should be noted that a configuration similar to the FIG. 22 mentioned above may be employed for the inverse transform circuits 705, 712, 713.

Figure 4:
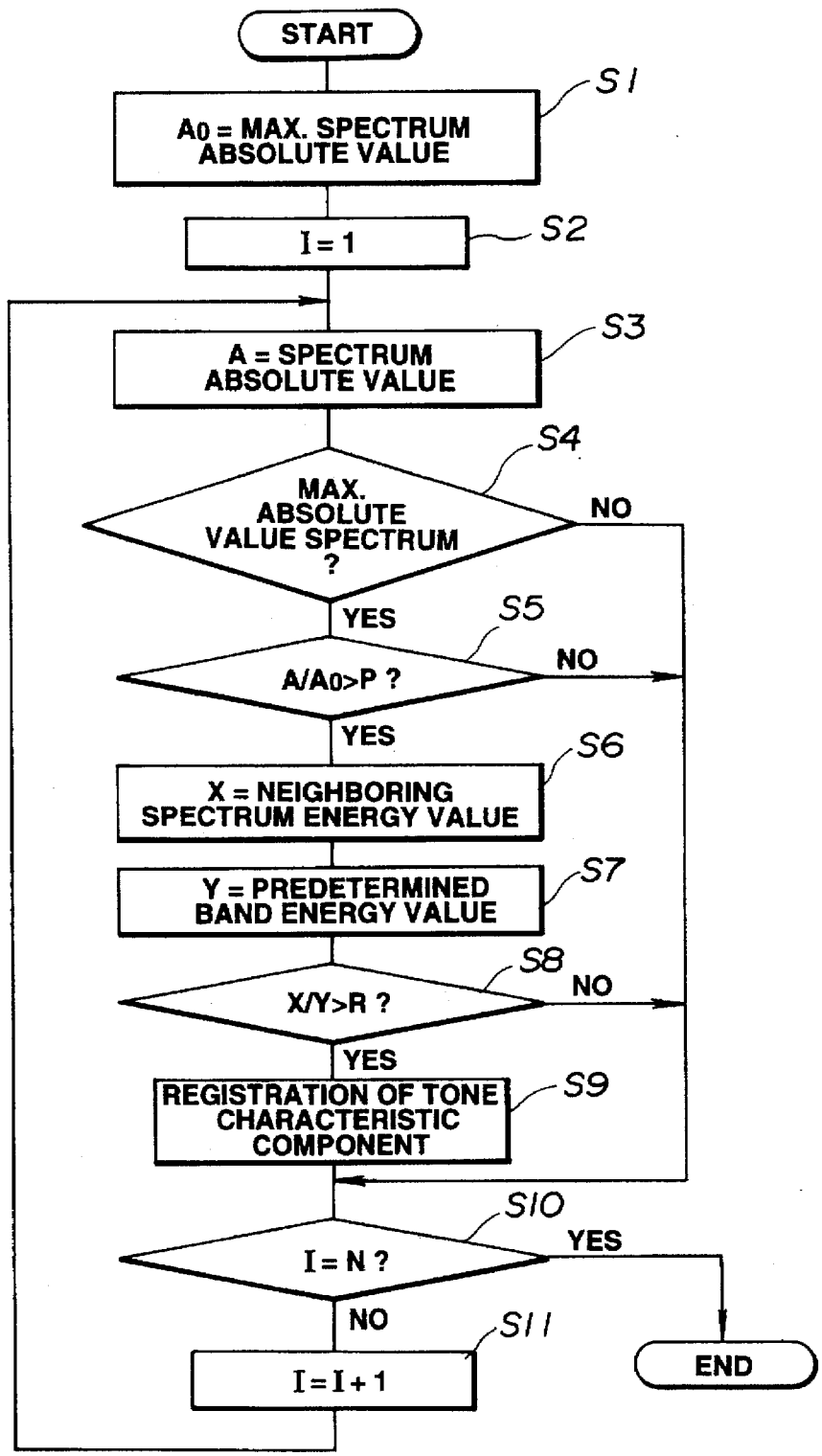
FIG. 4 is a flowchart showing flow of processing in signal component separating circuit of the embodiment according to this invention.

FIG. 4 shows flow of actual processing for separating tone characteristic component in signal component separating circuit 602 of encoding apparatus of FIG. 1.

In FIG. 4, I denotes the number of spectrum signals, N indicates total number of spectrum signals, and P, R indicate predetermined coefficients. Moreover, the above-mentioned tone characteristic component is determined on the basis of the following consideration. Namely, in the case where the absolute value of a certain spectrum signal is greater than other spectrum components when locally viewed, the difference between the absolute value and the maximum value of the absolute value of spectrum signals in a corresponding time block (block in spectrum transform processing) is a predetermined value or more, and sum of that spectrum and neighboring spectrum components (e.g., spectrum components adjoining thereto in both directions) indicates a predetermined ratio or more with respect to energy within a predetermined band including those spectrum components, that spectrum signal and spectrum signals adjoining thereto in both directions are considered to be tone characteristic component. It should be noted that, as a predetermined band for comparison of ratio of energy distribution, there may be employed a band such that bandwidth is narrow in a lower frequency band and is broad in higher frequency band in correspondence with the critical bandwidth by taking the property of the hearing sense into consideration.

Namely, in FIG. 4, initially, at step S1, maximum spectrum absolute value is substituted for variable AO. At step S2, I of spectrum signal is set to 1. At step S3, a certain spectrum absolute value within a certain time block is substituted for variable A.

At step S4, whether or not the spectrum absolute value is the maximum absolute value spectrum greater than other spectrum components when locally viewed is judged. As a result, when it is not the maximum absolute value spectrum (No), the processing operation proceeds to step S10. In contrast, in the case where it is the maximum absolute value spectrum (Yes), the processing operation proceeds to step S5.

At step S5, ratio between variable A of the maximum absolute value spectrum in corresponding time block including the maximum absolute value spectrum and variable AO of the maximum spectrum absolute value and coefficient P indicating a predetermined magnitude are compared (A/AO>P). As a result, in the case where A/AO is greater than P (Yes), the processing operation proceeds to step S6.

In contrast, in the case where A/AO is less than P (No), the processing operation proceeds to step S10.

At step S6, energy value of neighboring spectrum (e.g., sum of energies of spectrum components adjoining to corresponding spectrum in both directions) of the spectrum absolute value (maximum absolute value spectrum) is substituted for variable X. At the subsequent step S7, energy value within a predetermined band including the maximum absolute value spectrum and the neighboring spectrums thereof is substituted for variable Y.

At the subsequent step S8, ratio between variable X of the energy value and variable Y of energy value within a predetermined band and coefficient indicating a predetermined ratio are compared (X/Y>R). As a result, when X/Y is greater than R (Yes), the processing operation proceeds to step S9. In contrast, when X/Y is less than R (No), the processing operation proceeds to step S10.

At step S9, in the case where the energy in the maximum absolute value spectrum and the neighboring spectrum components thereof indicates a predetermined ratio or more with respect to energy within a predetermined band including those spectrum components, the signal of its maximum absolute value spectrum component and signals of spectrum components adjoining thereto in both directions are considered to be tone characteristic component to register that fact. At the subsequent step S10, whether or not number I of spectrum signal registered at the step S9 and total number N of spectrum signals are equal to each other (I=N) is judged. As a result, in the case where they are equal to each other (Yes), the processing is completed. In contrast, in the case where they are not equal to each other (No), the processing operation proceeds to step S11. At this step S11, I is set to I=I+1 to increase (increment) the number of spectrum signals by one. Thus, the processing operation returns to step S3 to repeat the above-mentioned processing.

Signal component separating circuit 602 delivers frequency component or components judged to be tone characteristic components by the above-described processing to tone characteristic encoding circuit 603, and delivers other frequency components as noise characteristic component to noise characteristic component encoding circuit 604. Moreover, signal component separating circuit 602 delivers the number of frequency information judged to be a tone characteristic component and information of that position to code train generating circuit 605.

Figure 5:
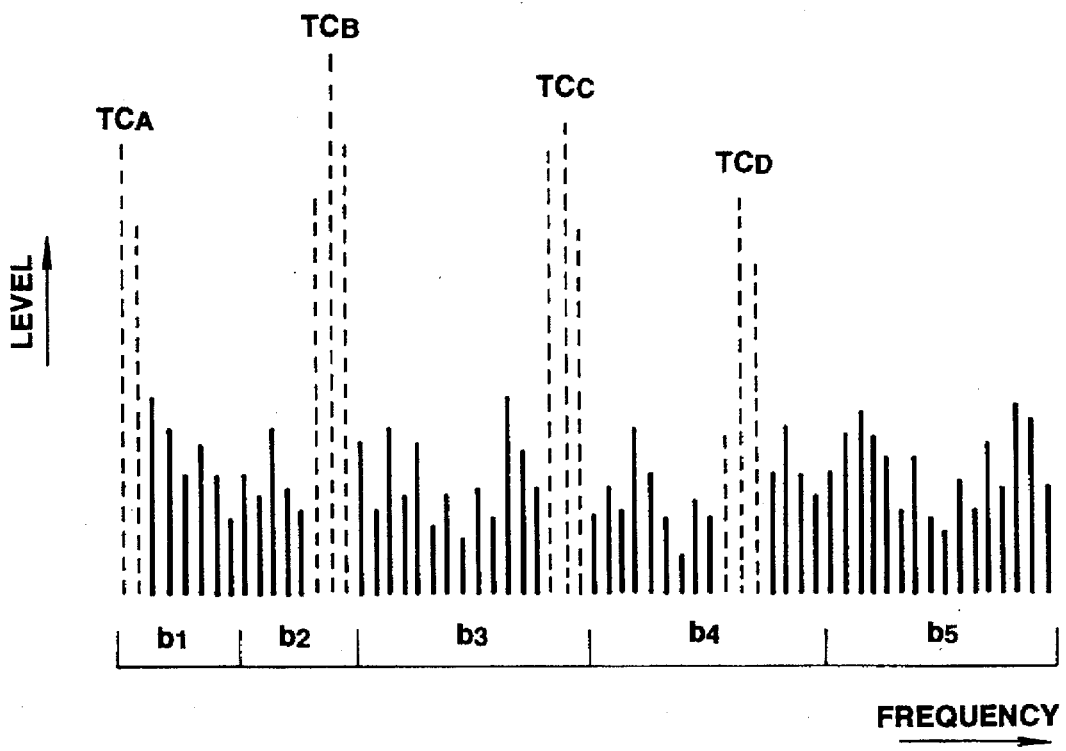
FIG. 5 is a view for explaining tone characteristic component in signal encoding of this embodiment.

FIG. 5 shows the state of one example where tone characteristic components are separated from frequency components in a manner as described above.

In the example shown in FIG. 5, four tone characteristic components indicated by TCA, TCB, TCC, TCD in the figure are extracted. Since these tone characteristic components are distributed in the state where they concentrate on a small number of spectrum signals as in the example of FIG. 5, even if these components are quantized with good accuracy, a large number of bits are not so required as a whole. Moreover, while tone characteristic components are once normalized thereafter to quantize the normalized components to thereby improve efficiency of encoding, since spectrum signals constituting the tone characteristic component are relatively small in number, processing of normalization and/or re-quantization may be omitted thus to simplify the apparatus.

Figure 6:
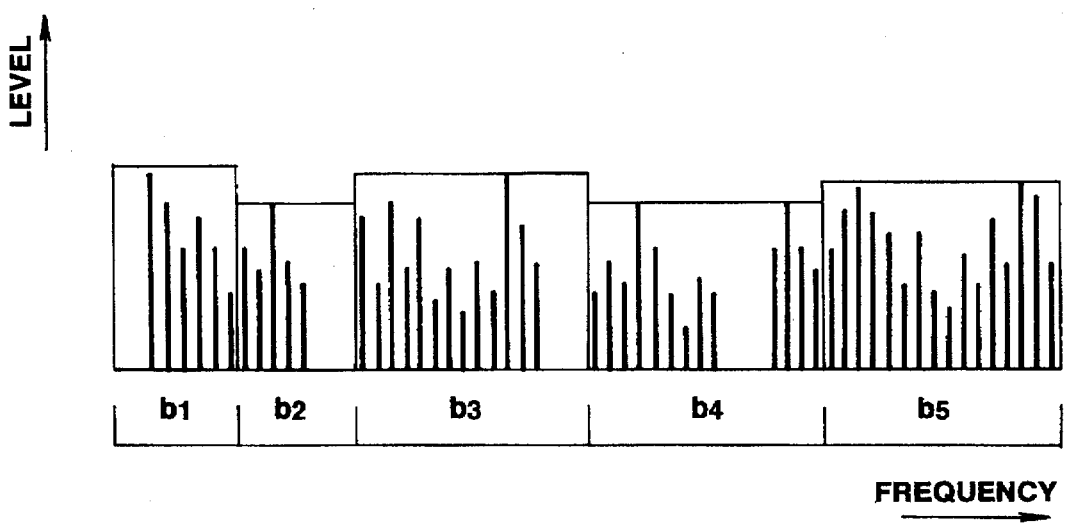
FIG. 6 is a view for explaining noise characteristic component in signal encoding of this embodiment.

FIG. 6 shows the example where noise characteristic components in which tone characteristic components are excluded from original spectrum signal is indicated.

As shown in FIG. 6, since tone characteristic-components are excluded as described above from the original spectrum signal in respective bands b1~b5, normalization coefficients in respective encoding units become small values. Accordingly, quantizing noise generated can be reduced using only a small number of bits.

By making use of the property of the hearing sense, encoding of the noise characteristic components can be carried out with a higher efficiency. Namely, in the vicinity of signal of tone characteristic on the frequency base, the masking effect is effectively exerted. Accordingly, even if encoding is carried out on the premise that noise characteristic component in the vicinity of extracted signal (noise characteristic component in the vicinity of the tone characteristic component) is equal to zero, a great difference is not felt from a viewpoint of the hearing sense between acoustic signal obtained by decoding it later and original sound.

An actual example of an encoding method in noise characteristic component encoding circuit 604 utilizing such a property will now be described with reference to FIG. 7.

Figure 7:
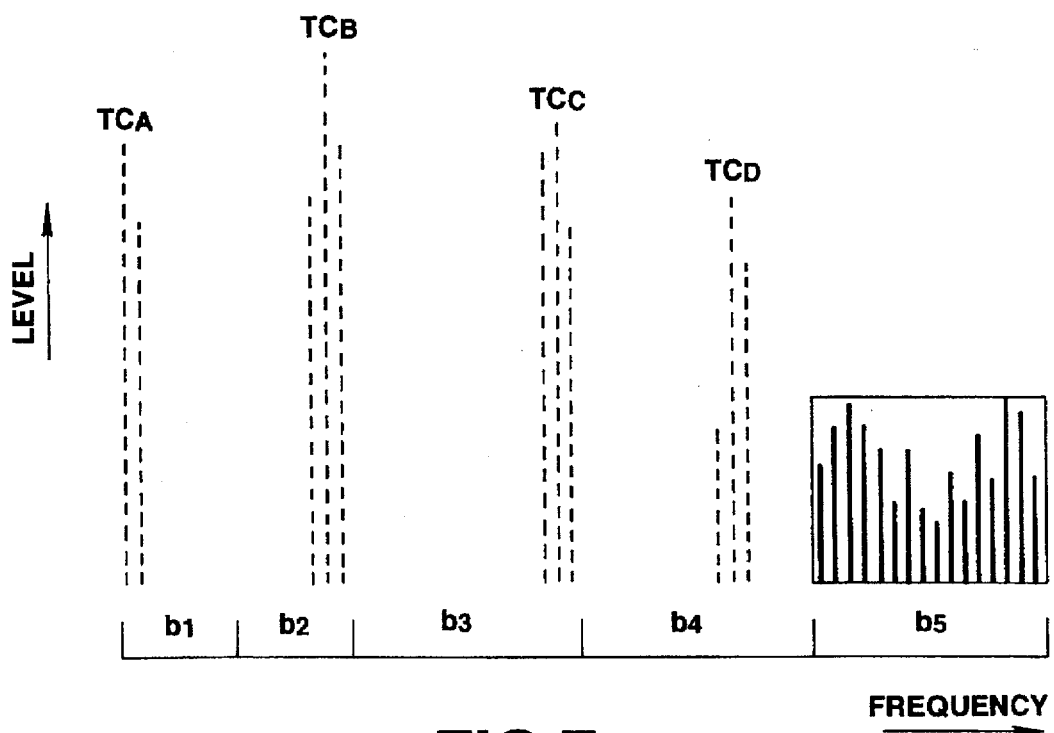
FIG. 7 is a view showing tone characteristic component separated in signal encoding of this embodiment.

In FIG. 7, noise characteristic components of encoding units where the principal portions of the tone characteristic components (TCA, TCB, TCC, TCD) exist—are caused to be zero. For this reason, the encoding unit actually encoded of noise characteristic components of respective bands is only the encoding unit of band b5. In accordance with this method, in such cases that encoding unit is taken with the critical bandwidth being a reference, and compression can be extremely easily carried out.

Another actual example of an encoding method utilizing such a property will now be described with reference to FIG. 8.

Figure 8:
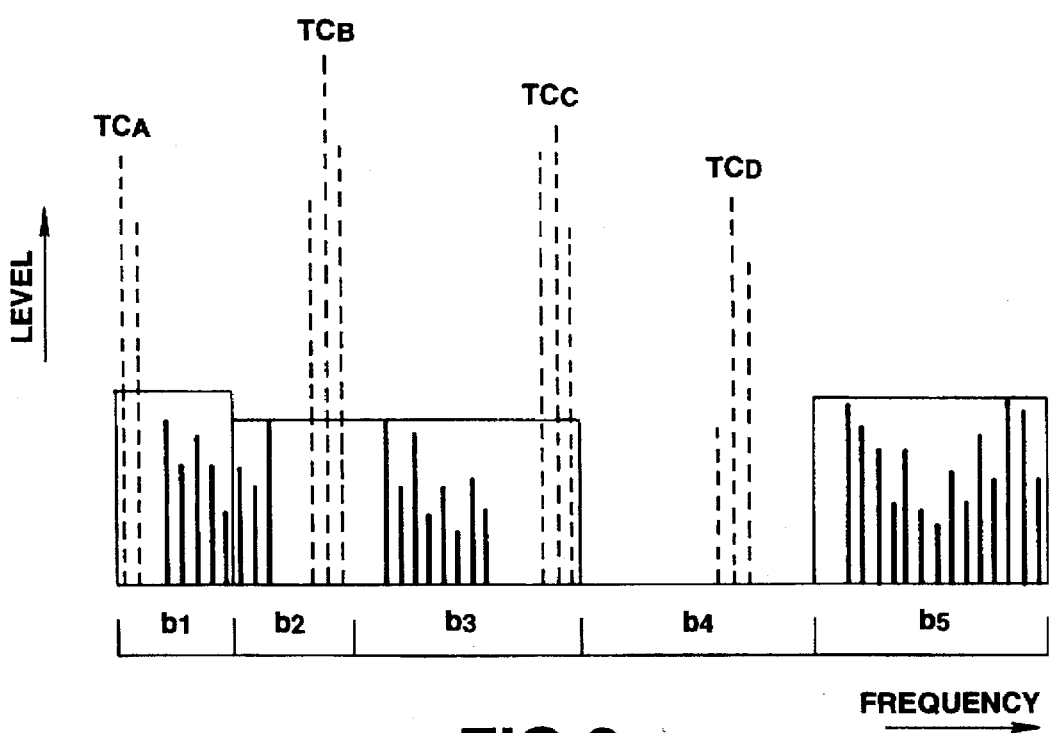
FIG. 8 is a view for explaining another example of signal encoding of this embodiment.

In FIG. 8, in place of the method in which noise characteristic components of encoding units are caused to be zero, there is employed a method in which a predetermined number of spectrum components adjoining to respective tone characteristic components (TCA, TCB, TCC, TCD) are caused to be zero. The predetermined number can be changed by frequency of tone characteristic component on the basis of the property of the hearing sense in such a manner that a small number of spectrum components are taken in a lower frequency band and a large number thereof are taken in a higher frequency band. Moreover, in this actual example, as the result of the above, noise characteristic components of encoding unit of band b4 are all equal to zero and those noise characteristic components of band b4 are not encoded in actuality. Also by the method of this actual example, it is possible to carry out efficient compression effective from a viewpoint of the hearing sense by relatively simple means it is to be noted that since masking by the tone characteristic component is exerted to be intensive with respect to the higher frequency band side, the range where noise characteristic components are caused to be zero may be asymmetric.

Moreover, noise characteristic components may be encoded, in code train generating circuit 605, by so called variable length codes described in D. A. Huffman: A Method for Construction of Minimum Redundancy Codes, Proc. I.R.E., 40, p. 1098 (1952). In such an encoding method, short code lengths are allocated to pattern having high frequency to thereby improve efficiency of encoding. However, in the case where such a coding method is used, the method in which components of noise characteristic are caused to be zero as previously described is effectively exerted. Namely, since such noise components appear to much degree, short length codes are allocated to 0, thereby making it possible to improve efficiency of encoding.

The method of this embodiment in which tone characteristic components are separated to allow tone characteristic components and signals in the vicinity thereof to be caused to be zero thereafter to encode noise characteristic components has been described above. In addition, there may be employed a method of encoding tone characteristic components to decode the encoded component to subtract the decoded signal thus obtained from original spectrum signal to encode it.

Figure 9:
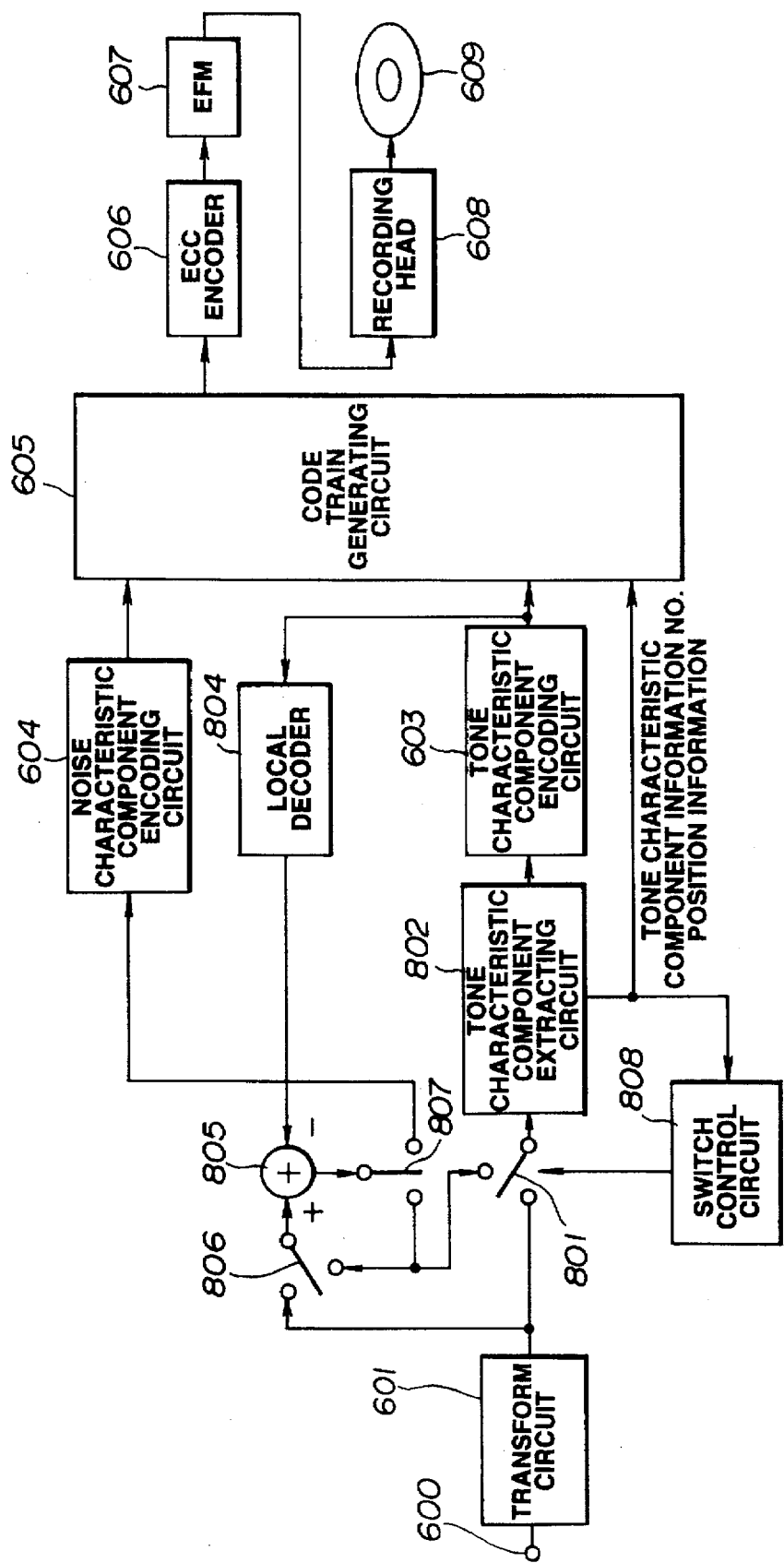
FIG. 9 is a circuit diagram showing, in a block form, outline of the configuration of a signal encoding apparatus for explaining a signal encoding method of this embodiment.

A signal encoding apparatus by this method will now be described with reference to FIG. 9. It is to be noted that the same reference numerals are respectively attached to the same components as those of FIG. 1 and their explanation is omitted.

Spectrum signal obtained by transform circuit 601 is delivered to tone characteristic component extracting circuit 802 through switch 801 controlled by control circuit 808. This tone characteristic component extracting circuit 802 discriminates tone characteristic component by the above-described processing of FIG. 4 to deliver only the discriminated tone characteristic component to tone characteristic component encoding circuit 603. Moreover, tone characteristic component extracting circuit 802 outputs the number of tone characteristic component information and its center position information to code train generating circuit 605. The tone characteristic component encoding, circuit 603 implements normalization and quantization to the inputted tone characteristic component to deliver the normalized and quantized tone characteristic component to code train generating circuit 605 and local decoder 804. This local decoder 804 implements inverse quantization and releasing of normalization to the normalized and quantized tone characteristic component to decode signal of original tone characteristic component it should be noted that quantizing noise would be included in decoded signal at this time. Output from local decoder 804 is delivered to adder 805 as the first decoded signal. Moreover, original spectrum signal from transform circuit 601 is delivered to adder 805 through switch 806 controlled by switch control circuit 808. This adder 805 subtracts the first decoded signal from the original spectrum signal to output the first difference signal. In the case where processing sequence of extraction, encoding, decoding, and difference determination of tone characteristic component is completed by only one processing sequence, the above-mentioned first difference signal is delivered as noise characteristic component to noise characteristic component encoding circuit 604 through switch 807 controlled by switch control circuit 808. Moreover, when processing sequence of extraction, encoding, decoding, and difference determination of tone characteristic component is repeated, the first difference signal is delivered to tone characteristic component extracting circuit 802 through switch 801. Tone characteristic component extracting circuit 802, tone characteristic component encoding circuit 603, and local decoder 804 carry out processing similar to the above. Thus, the second decoded signal obtained is delivered to adder 805. Moreover, the first difference signal is delivered to adder 805 through switch 806. Adder 805 subtracts the second decoded signal from the first difference signal to output the second difference signal. Further, in the case where processing sequence of extraction, encoding, decoding, and difference determination of tone characteristic component is completed by two cycles of the processing sequence, the second difference signal is delivered to noise characteristic component encoding circuit 604 through switch 807 as noise characteristic component. In the case where processing sequence of extraction, encoding, decoding, and difference determination of tone characteristic component is further repeated, processing similar to the above is carried out by tone characteristic component extracting circuit 802, tone characteristic component encoding circuit 603, and local decoder 804 and adder 805. Switch control circuit 808 holds the threshold value of tone characteristic component information number, and controls switch 807 so that extraction, encoding, decoding, and difference determination processing sequence of tone characteristic component is completed in the case where tone characteristic component information number obtained from the tone characteristic component extracting circuit is above the threshold value. In addition, in tone characteristic component encoding circuit 603, there can be employed a processing such that when tone characteristic component is ceased to be extracted, extraction, encoding, decoding and difference determination processing sequence of tone characteristic component is completed.

Figure 10:
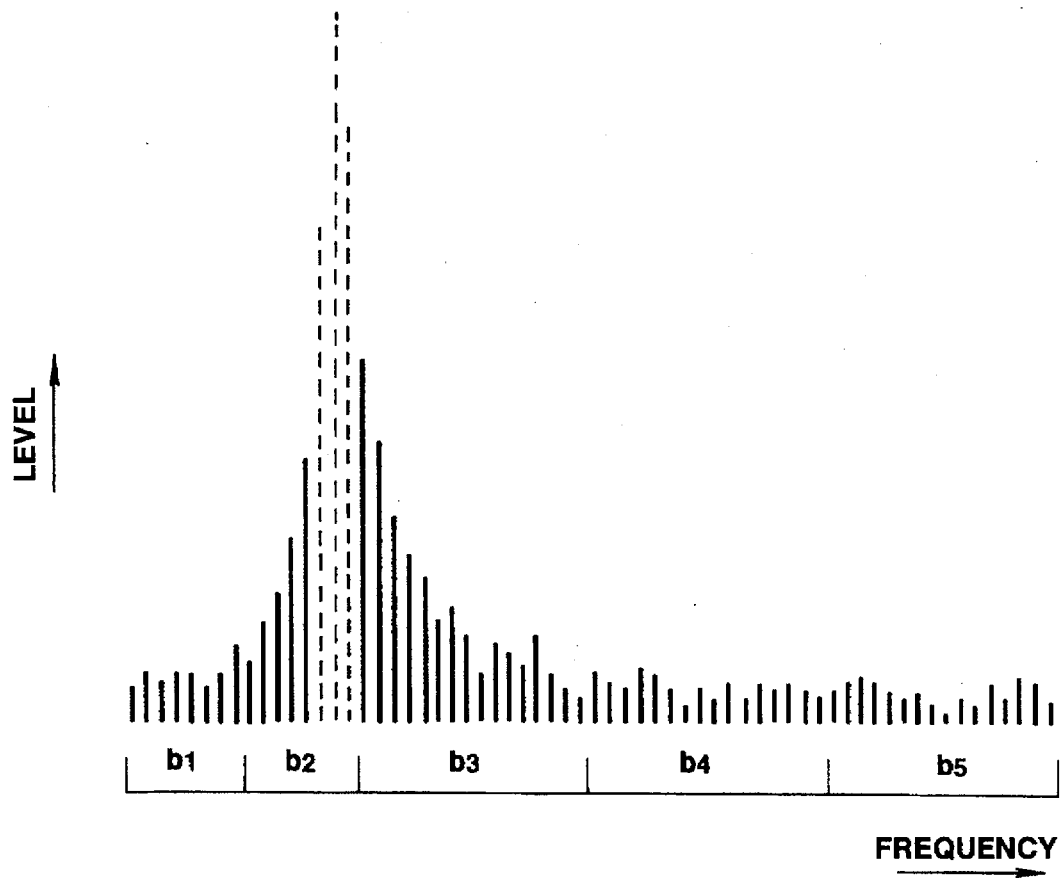
FIG. 10 is a view for explaining a method for encoding a signal obtained by subtracting, from original spectrum signal, a signal obtained by encoding tone characteristic component to decode the encoded component in signal encoding of this embodiment.
Figure 11:
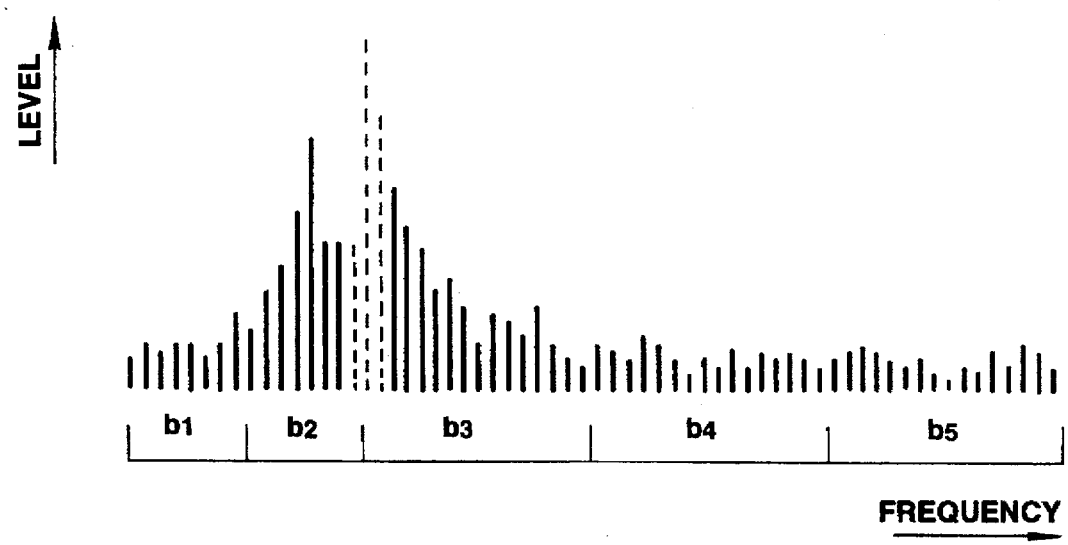
FIG. 11 is a view showing that signal obtained by encoding tone characteristic component to decode the encoded component is subtracted from original spectrum signal in signal encoding of this embodiment.

FIGS. 10 and 11 show the example where encoding is carried out by such a method, wherein FIG. 11 shows a signal in which signal obtained by encoding one tone characteristic component to decode the encoded signal is subtracted from spectrum signal of FIG. 10.

Moreover, components indicated by broken lines in the figure are further extracted from the spectrum signal of FIG. 11 as tone characteristic component, thereby making it possible to improve encoding accuracy of spectrum signal. By repeating such an operation, high accuracy encoding can be carried out. In the case where this method is used, even if the upper limit of the number of bits for quantizing tone characteristic component is set to low value, encoding accuracy can be sufficiently high. Accordingly, there is also the merit that the number of bits for recording quantization bit number can be reduced. Further, the method of extracting tone characteristic components in a multi-stage manner as stated above can be applied necessarily not only to the case where a signal equivalent to a signal obtained by encoding tone characteristic component to decode the encoded signal is subtracted from the original spectrum signal, but also to the case where spectrum signal of the extracted tone characteristic component is caused to be zero. In the description of this invention, the expression that "signal from which tone characteristic components are separated", etc. should be considered to include the above-mentioned both cases.

Figure 12:
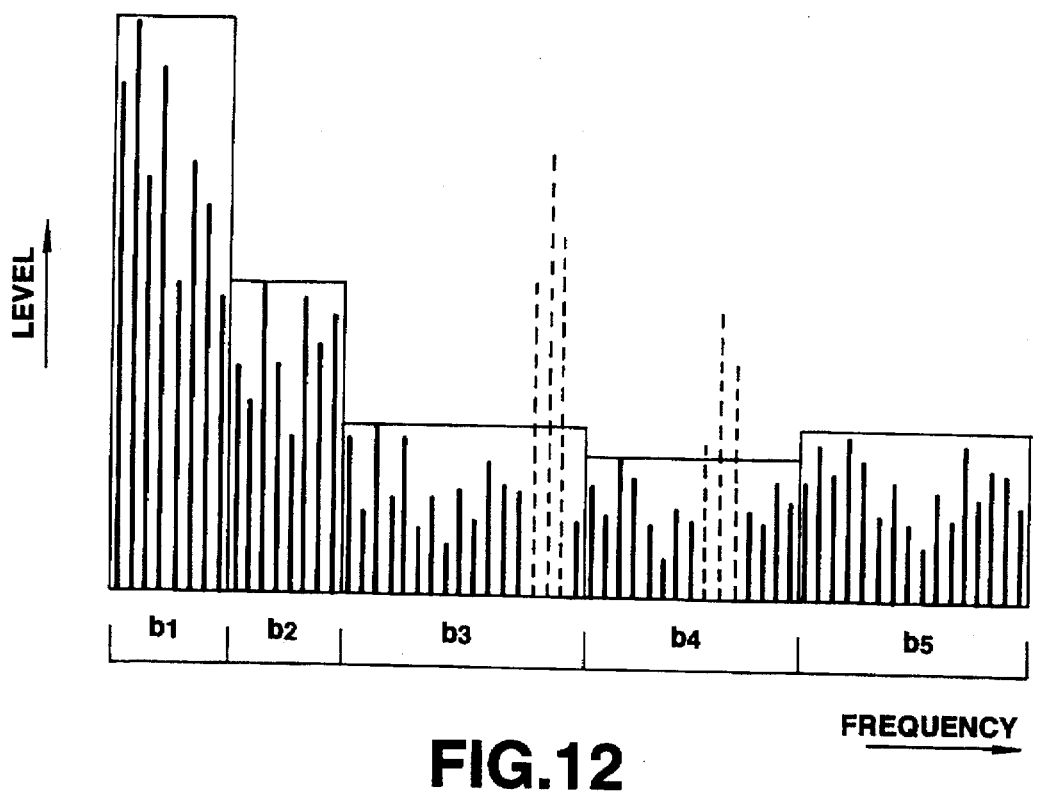
FIG. 12 is a view for explaining the case where extraction of tone characteristic component is carried out only in a higher frequency band in signal encoding of this embodiment.

FIG. 12 shows an actual example where extraction of tone characteristic components is carried out only in higher frequency band.

Generally, in the case where spectrum transform processing is carried out, transform period length of spectrum transform processing must be extremely long in order to ensure sufficient frequency resolution in lower frequency band. It is difficult to realize this by a device of small scale. Moreover, in order to encode tone characteristic component, it is necessary to encode position information or normalization information of that tone characteristic component. However, in the case where there are a large number of tone characteristic components having poor degree of separation in low frequency band, employment of a method of recording this information by the number of extracted tone characteristic components is disadvantageous to improvement in efficiency in encoding. Accordingly, in the case where frequency resolution is not sufficiently taken on the lower frequency band side, there may be employed a method as in the example of FIG. 12 in which tone characteristic components are separated only on the higher frequency band side to encode the component thus separated.

Figure 19:
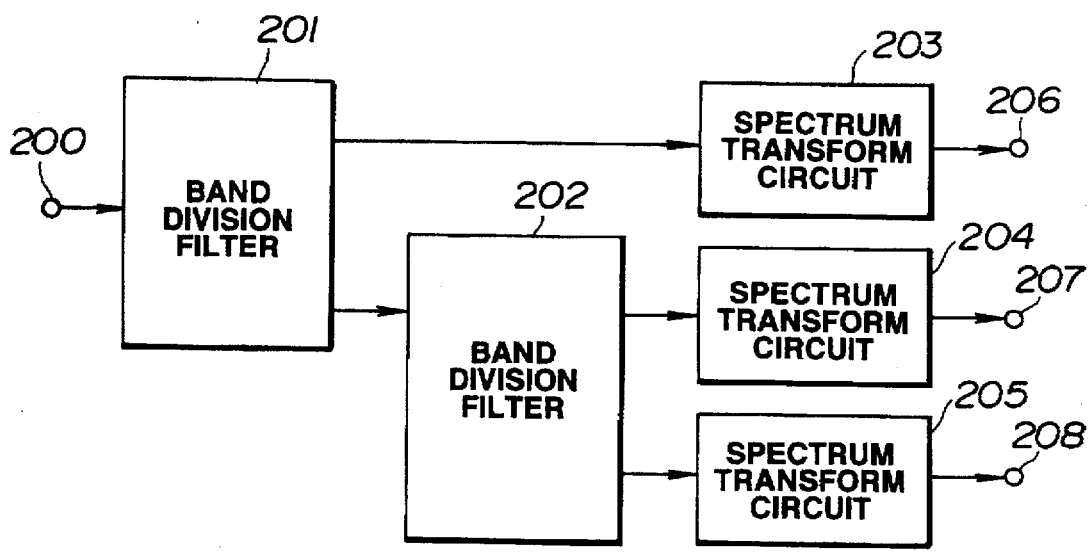
FIG. 19 is a circuit diagram showing, in a block form, actual configuration of transform circuits of this embodiment and conventional encoding apparatus.
Figure 20:
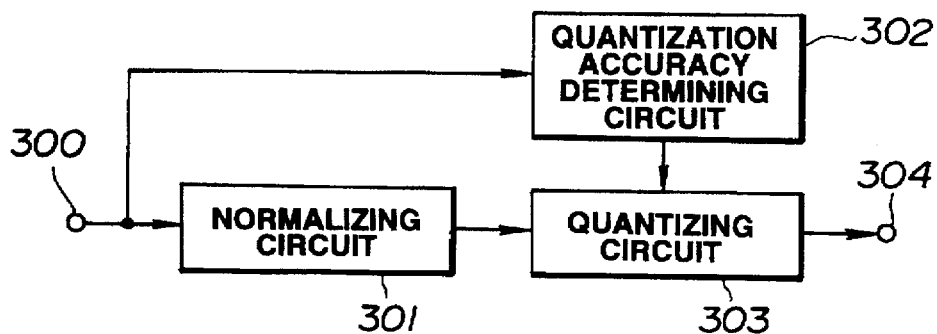
FIG. 20 is a circuit diagram showing, in a block form, actual configuration of a signal component encoding circuit of this embodiment and conventional encoding apparatus.
Figure 21:
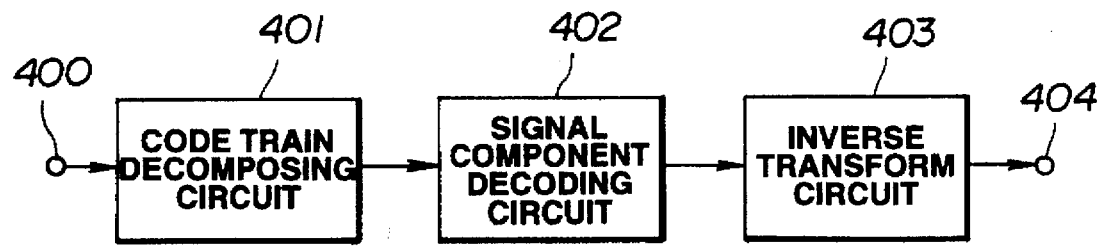
FIG. 21 is a circuit diagram showing, in a block form, outline of the configuration of conventional decoding apparatus.

Further, in order to ensure sufficient frequency resolution in a lower frequency band, there may be employed an approach in which frequency resolutions in lower and higher frequency bands are caused to be different from each other. For example, in the previously described transform circuit of FIG. 19 applied to the transform circuit 601 of FIG. 1 of this embodiment, rates of output signals of two bands of band division filter 202 are thinned so that they are equal to one half of rate of signal sent to spectrum transform circuit 203 of band division filter 201. However, if spectrum transform processing is implemented to the same number of input signals at spectrum transform circuits 203, 204, 205, frequency resolutions of spectrum signals from forward spectrum transform circuits 204, 205 can be twice the resolution of spectrum signal from spectrum transform circuit 203.

Figure 13:
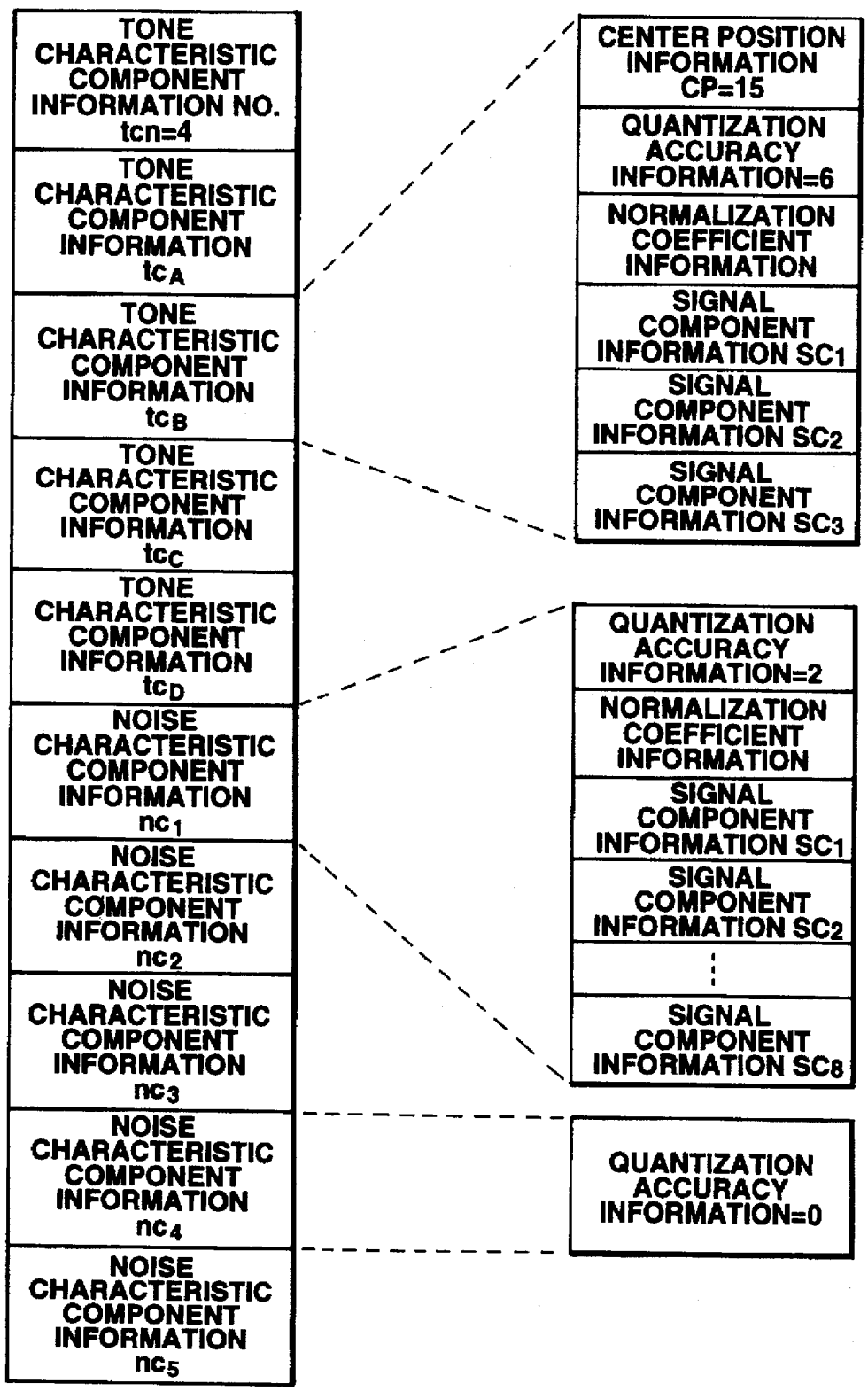
FIG. 13 is a view for explaining recording of code train obtained after undergone encoding by signal encoding of this embodiment.

FIG. 13 shows an actual example of code train (code train recorded on recording medium) in the case where spectrum signal of FIG. 8 is encoded by the method of the embodiment according to this invention.

In FIG. 13, first of all, tone characteristic component information number tcN (4 in the example of FIG. 8) is recorded onto recording medium. Then, tone characteristic component information tcA, tcB, tcC, tcD corresponding to tone characteristic components TCA, TCB, TCC, TCD of FIG. 8 and noise characteristic component information nc1, nc2, nc3, nc4, nc5 corresponding to respective frequency bands b1~b5 of FIG. 8 are recorded in the order recited.

In this case, as the tone characteristic component information, center position information CP indicating position of center spectrum of that tone characteristic component (e.g., 15 in the case of tone characteristic component TCB), quantization accuracy information indicating the number of bits for quantization (e.g., 6 in the case of tone characteristic component TCB) and normalization coefficient information will be recorded onto recording medium along with normalized and quantized respective signal component information (e.g., information SC1, SC2, SC3). It should be noted that in such cases that quantization accuracies are fixedly determined for every respective frequency band, there is of course no necessity of recording quantization accuracy information.

While, in the above-described embodiment, positions of center spectrum components of respective tone characteristic components are used as position information of tone characteristic component, positions of spectrum components of the lowest frequency band of respective tone characteristic components (e.g., 14 in the case of tone characteristic component TCB) may be recorded.

Moreover, with respect to the noise characteristic component information, quantization accuracy information and normalization coefficient information will be recorded onto the recording medium along with normalized and quantized respective signal component information (e.g., information SC1, SC2, ..., SC8). It should be noted that in the case where quantization accuracy information is zero (noise characteristic component information nc4 of FIG. 13), it is indicated that encoding is not actually carried out in that encoding unit. Also, in the case where quantization accuracies are fixedly determined for every respective frequency band, there is no necessity of recording quantization accuracy information. At this time, however, it becomes impossible to designate encoding unit where no encoding is carried out in fact like frequency band b4, for example. In such a case, it is sufficient to add flag information of 1 bit indicating whether or not encoding is actually carried out in respective encoding units.

As described above, in order to record tone-characteristic component information onto the recording medium by the method of the embodiment according to this invention, it is necessary to record position of that tone characteristic component by any method. Such position information can be efficiently recorded by a method as described below.

Figure 14:
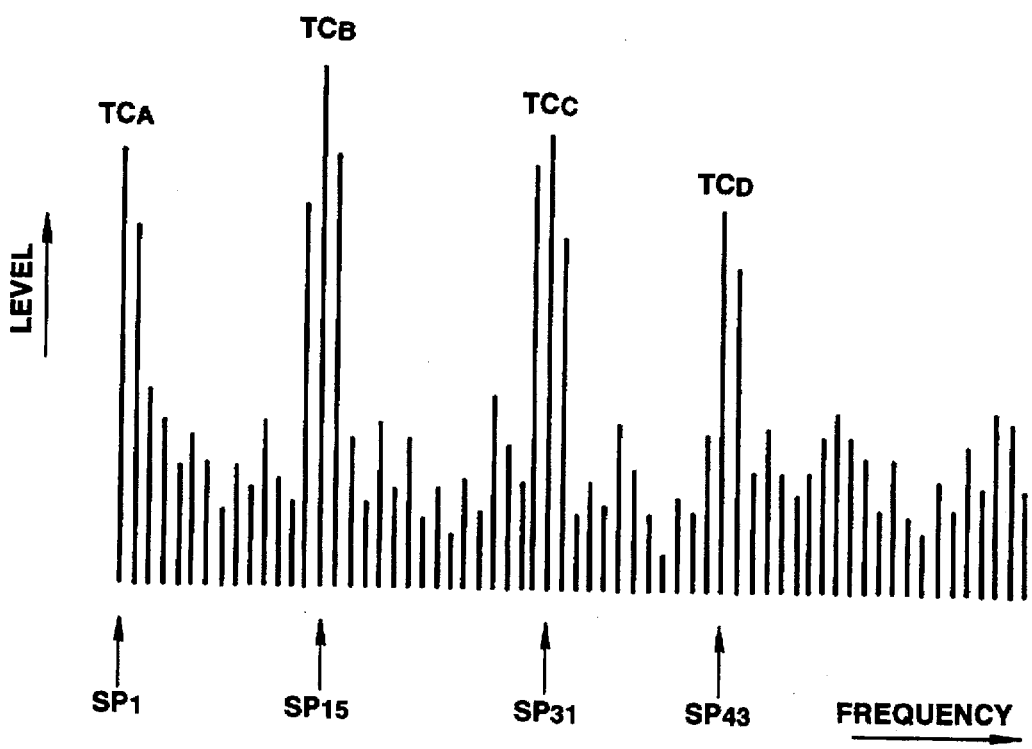
FIG. 14 is a view showing the state of spectrum signal in a certain time block in signal encoding of this embodiment.
Figures 15, 16:
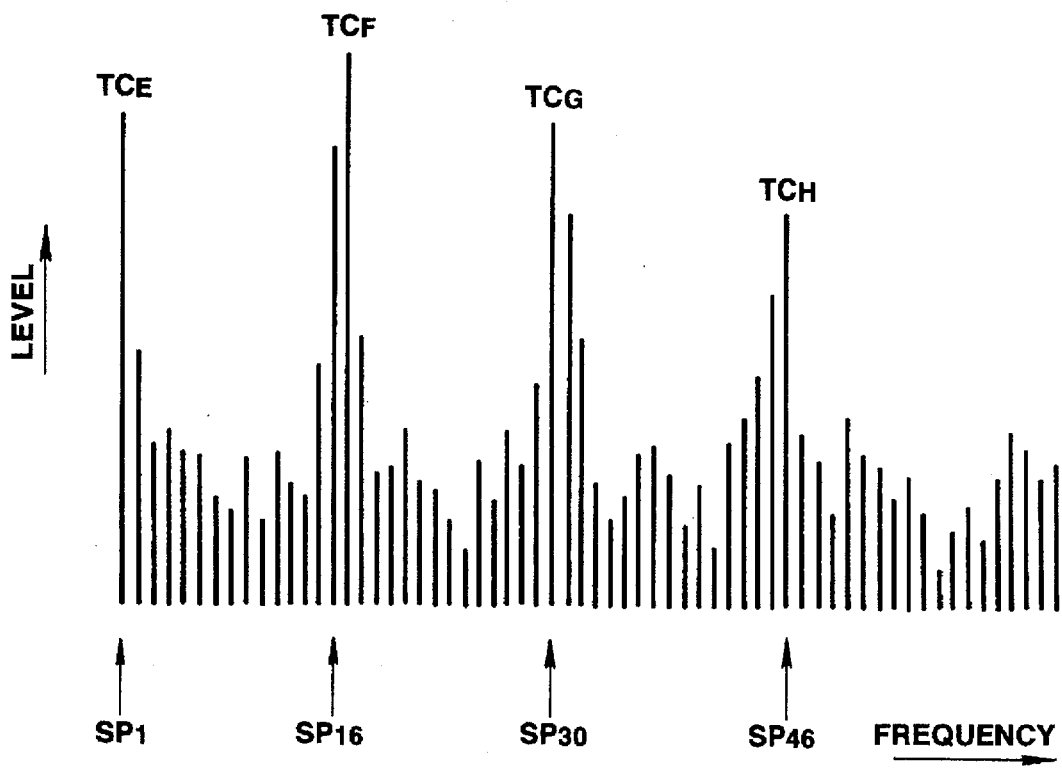
FIG. 15 is a view showing the state of spectrum signal in a time block adjacent to a certain time block in signal encoding of this embodiment.
FIG. 16 is a view for explaining the example where center position information of tone characteristic component information of spectrum signal in time block of this embodiment is encoded by 2 bits.

FIGS. 14 and 15 show the state of spectrum signal in adjacent time blocks, wherein spectrum signal of FIG. 15 indicates spectrum signal of the next time block of FIG.

In these FIGS. 14 and 15, spectrum signal obtained by the MDCT varies every block by slight fluctuation of phase or waveform signal of that time block, but position of tone characteristic component is substantially the same as that of the former block. It correspondence with tone characteristic components of TCA, TCB, TCC, TCD of FIG. 14, there appear tone characteristic components of TCE, TCF, TCG, TCH of FIG. 15. Thus, center position information of tone characteristic component can be efficiently recorded by relative position with respect to center position information of tone characteristic component of the former time block. Actual examples thereof are shown in FIGS. 16 and 17.

In FIG. 16, it is assumed that tone characteristic component information in time block of FIG. 14 are recorded in order of tcA, tcB, tcC, tcD. Here, among spectrum signals in time block of FIG. 15, as center position information CP of tone characteristic component information tcF of TCF of FIG. 15, center position information CP1 is obtained by encoding center position difference information CP with respect to tone characteristic component of TCB by 2 bits as shown in FIG. 16 and can be recorded as shown in FIG. 17. As stated above, many center position information CP of tone characteristic component are caused to corresponding to tone characteristic component of any other time block, e.g., time block immediately before, thereby making it possible to express it by short code. Thus, efficient coding can be made. It should be noted that since tone characteristic component of TCH is the component in which tone characteristic component of TCD is changed, but cannot be expressed by center position difference information of FIG. 16 with respect to this component, tone characteristic component information of TCD is caused to be once invalid to record information of tone characteristic component of TCH by using center position information CP2. It is further to be noted that code shown in FIG. 17 is presented only for illustrative purpose, and since tone characteristic component information number tcn1 can be recognized from information of the former time block, it may be omitted.

While explanation has been given mainly in connection with the example where the method of the embodiment according to this invention is applied to an acoustic signal, the method, of the embodiment according to this invention can be applied also to encoding of a general waveform signal. However, in the case of the acoustic signal, tone characteristic component information has particularly important meaning from a viewpoint of the hearing sense. Therefore, the method of the embodiment according to this invention can be particularly effectively applied.

As is clear from the foregoing description as well, when signal encoding apparatus and method, and signal decoding apparatus and method are used, it is possible to efficiently encode components of tone characteristic of input signal in the state separated from other components. Particularly, in the case where this invention is used for encoding of an acoustic signal, components of tone characteristic which are important from a viewpoint of the hearing sense can be encoded with sufficiently high accuracy, and components of noise characteristic which are not so important from a viewpoint of the hearing sense can be encoded with the minimum accuracy. Thus, extremely efficient signal compression can be made. Accordingly, if signals compressed in this way are recorded onto a recording medium, recording capacity can be effectively used. In addition, if signals obtained by reproducing such a recording medium are decoded, satisfactory acoustic signals can be provided.

What is claimed is:

1. A method of encoding an input acoustic signal, comprising the steps of:

transforming the input acoustic signal into a block of frequency components, each frequency component characterized by an energy distribution;

separating the frequency components into a first signal consisting of tone characteristic components, each tone characteristic component having a sharp energy distribution relative to energy distributions of frequency components in a local neighborhood of the tone characteristic component and to energy distributions of frequency components in the block, and a second signal consisting of components other than the tone characteristic components;

encoding the first signal; and encoding a signal based on the second signal.

2. A signal encoding method as set forth in claim 1, wherein the transform processing is spectrum transform processing.

3. A signal encoding method as set forth in claim 1, wherein position information on the frequency base of the tone characteristic component is encoded.

4. A signal encoding method as set forth in claim 3, wherein the position information includes information indicating a difference between position information of a current block and position information of any other time block.

5. A signal encoding method as set forth in claim 1, wherein numeric information within a predetermined range of the tone characteristic component is encoded.

6. A signal encoding method as set forth in claim 1, wherein the signal based on the second signal is a signal in which a signal of an encoding unit including the principal portion of the tone characteristic components of the first signal of frequency components is caused to be zero.

7. A signal encoding method as set forth in claim 1, wherein the signal based on the second signal is a signal in which the first signal and neighboring frequency components thereof of the frequency component are caused to be zero.

8. A signal encoding method as set forth in claim 7, wherein the number of frequency components caused to be zero with respect to respective frequency components of the first signal is such that the number of such frequency component on a higher frequency band side is greater than that on a lower frequency band side.

9. A signal encoding method as set forth in claim 7, wherein the number of frequency components caused to be zero with respect to one frequency component of the first signal is asymmetric with respect to a higher frequency band side and a lower frequency band side with one frequency component of the first signal being as a center.

10. A signal encoding method as set forth in claim 1, wherein the step of separation includes the steps of encoding the tone characteristic component, decoding the encoded tone characteristic component, and subtracting the decoded tone characteristic component from any frequency component of the input signal to generate a difference signal, and wherein the second signal is the difference signal.

11. A signal encoding method as set forth in claim 10 wherein the step of separation at least once includes the steps of encoding a tone characteristic component of the difference signal, decoding the encoded tone characteristic component, and subtracting the decoded tone characteristic component from the difference signal to generate a new difference signal to allow the new difference signal to be the difference signal, and wherein the second signal is the new difference signal.

12. A signal encoding method as set forth in claim 1, wherein at least the step of encoding of the signal based on the second signal of the step of encoding of the first signal and the step of encoding of the signal based on the second signal includes the steps of:

normalizing an inputted signal every encoding units; and quantizing the normalized signals.

13. A signal encoding method as set forth in claim 1, wherein at least the step of encoding of the signal based on the second signal of the step of encoding of the first signal and the step of encoding of the signal based on the second signal includes:

a step of implementing variable length encoding to an inputted signal.

14. A signal encoding method as set forth in claim 1, wherein the step of separation separates the first signal only from a high frequency band of the frequency components.

15. A signal encoding method as set forth in claim 1, wherein the step of transform processing carries out transform processing so that frequency resolution on a lower frequency band side is higher than frequency resolution on a higher frequency band side.

16. A signal encoding method as set forth in claim 1, wherein the input signal is audio signal.

17. A signal encoding apparatus adapted for encoding an input acoustic signal, comprising:

means for transforming the input acoustic signal into a block of frequency components, each frequency component characterized by an energy distribution;

means for separating the frequency components into a first signal consisting of tone characteristic components, each tone characteristic component having a sharp energy distribution relative to energy distributions of frequency components in a local neighborhood of the tone characteristic component and to energy distributions of frequency components in the block, and a second signal consisting of components other than the tone characteristic components;

first encoding means for encoding the first signal; and second encoding means for encoding a signal based on the second signal.

18. A signal encoding apparatus as set forth in claim 17, wherein the transform processing is spectrum transform processing.

19. A signal encoding apparatus as set forth in claim 17, which includes:

position information encoding means for encoding position information on the frequency base of the tone characteristic component.

20. A signal encoding apparatus as set forth in claim 19, wherein the position information includes position information indicating a difference between position information of a current block and position information of any other time block.

21. A signal encoding apparatus as set forth in claim 17, which includes;

encoding means for encoding numeric information within a predetermined range of the tone characteristic components.

22. A signal encoding apparatus as set forth in claim 17, wherein the signal based on the second signal is a signal in which a signal of an encoding unit including the principal portion of tone characteristic components of the first signal of frequency components is caused to be zero.

23. A signal encoding apparatus as set forth in claim 17, wherein the signal based on the second signal is a signal in which the first signal and neighboring frequency components thereof of the frequency component are caused to be zero.

24. A signal encoding apparatus as set forth in claim 23, wherein the number of frequency components caused to be zero with respect to respective frequency components of the first signal is such that the number of such components on a higher frequency band side is greater than that on a lower frequency band side.

25. A signal encoding apparatus as set forth in claim 23, wherein the number of frequency components caused to be zero with respect to one frequency component of the first signal is asymmetric with respect to a higher frequency band side and a lower frequency band side with one frequency component of the first signal being as a center.

26. A signal encoding apparatus as set forth in claim 17, wherein the separating means includes:
encoding means for encoding the tone characteristic component;
decoding means for decoding the encoded tone characteristic component; and
means for subtracting the decoded tone characteristic component from any frequency component of the input signal to generate a difference signal, and
wherein the second signal is the difference signal.

27. A signal encoding apparatus as set forth in claim 26, wherein the separating means includes:
encoding means for encoding a tone characteristic component of the difference signal;
decoding means for decoding the encoded tone characteristic component; and
means for subtracting the decoded tone characteristic component from the difference signal to generate a new difference signal to output the new difference signal as the difference signal, and
wherein the second signal is the new difference signal.

28. A signal encoding apparatus as set forth in claim 17, wherein at least the second encoding means of the first encoding means and the second encoding means includes:
normalizing means for normalizing an inputted signal every encoding units; and
quantizing means for quantizing the normalized signals.

29. A signal encoding apparatus as set forth in claim 17, wherein at least the second encoding means of the first encoding means and the second encoding means includes:
variable length encoding means for implementing variable length encoding to an inputted signal.

30. A signal encoding apparatus as set forth in claim 17, wherein the separating means separates the first signal only from a higher frequency band of the frequency components.

31. A signal encoding apparatus as set forth in claim 17, wherein the transform means carries out transform processing so that frequency resolution on a lower frequency band side is higher than frequency resolution on a higher frequency band side.

32. A signal encoding apparatus as set forth in claim 17, wherein the input signal is audio signal.

33. A signal recording medium on which encoded signals are recorded,
wherein the signal recording medium is formed by the steps of:
transforming an input acoustic signal into a block of frequency components, each frequency component characterized by an energy distribution;
separating the frequency components into a first signal consisting of tone characteristic components, each tone characteristic component having a sharp energy distribution relative to energy distributions of frequency components in a local neighborhood of the tone characteristic component and to energy distributions of frequency components in the block, and a second signal consisting of components other than the tone characteristic components;
encoding the first signal; and
encoding a signal based on the second signal.
recording the encoded first and second signals.

34. A signal recording medium as set forth in claim 33, wherein the transform processing is spectrum transform processing.

35. A signal recording medium as set forth in claim 33, the signal recording medium being formed by the steps of:
encoding position information on the frequency base of the tone characteristic component; and
recording the encoded position information.

36. A signal recording medium as set forth in claim 35, wherein the position information includes information indicating a difference between position information of a current block and position information of any other time block.

37. A signal recording medium as set forth in claim 33, the signal recording medium being formed by the steps of:
encoding numeric information within a predetermined range of the tone characteristic components; and
recording the encoded numeric information.

38. A signal recording medium as set forth in claim 33, wherein the signal based on the second signal is a signal in which a signal of an encoding unit including the principal portion of tone characteristic components of the first signal of frequency components is caused to be zero.

39. A signal recording medium as set forth in claim 33,
wherein the signal based on the second signal is a signal in which the first signal and neighboring frequency components thereof of the frequency components are caused to be zero.

40. A signal recording medium as set forth in claim 39, wherein the number of frequency components caused to be zero with respect to respective frequency components of the first signal is such that the number of such frequency components on a higher frequency band side is greater than that on a lower frequency band side.

41. A signal recording medium as set forth in claim 39, wherein the number of frequency components caused to be zero with respect to one frequency component of the first signal is asymmetric with respect to a higher frequency band side and a lower frequency band side with one frequency component of the first signal being as a center.

42. A signal recording medium as set forth in claim 33, wherein the step of separation includes the steps of
encoding the tone characteristic component, decoding the encoded tone characteristic component, and subtracting the decoded tone characteristic component from any frequency component of the input signal to generate a difference signal, and wherein the second signal is the difference signal.

43. A signal recording medium as set forth in claim 42, wherein the step of separation includes at least once the steps of encoding a tone characteristic component of the difference signal, decoding the encoded tone characteristic component, and subtracting the decoded tone characteristic component from the difference signal to generate a new difference signal to allow the new difference signal to be the difference signal, and wherein the second signal is the new difference signal.

44. A signal recording medium as set forth in claim 33, wherein at least the step of encoding of the signal based on the second signal of the step of encoding of the first signal and the step of encoding of the signal based on the second signal includes a step of:

normalizing an inputted signal every encoding units; and quantizing the normalized signals.

45. A signal recording medium as set forth in claim 33, wherein at least the step of encoding of the signal based on the second signal of the step of encoding of the first signal and the step of encoding of the signal based on the second signal includes:

a step of implementing variable length encoding to an inputted signal.

46. A signal recording medium as set forth in claim 33, wherein the step of separation separates the first signal only from a higher frequency band of the frequency components.

47. A signal recording medium as set forth in claim 33, wherein the step of transform processing carries out transform processing so that frequency resolution on a lower frequency band side is higher than frequency resolution on a higher frequency band side.

48. A signal recording medium as set forth in claim 33, wherein the input signal is audio signal.

49. A signal recording medium on which encoded signals are recorded, wherein tone characteristic component information relating to tone characteristic components and noise characteristic component information relating to noise characteristic components are separately recorded, each tone characteristic component having a sharp energy distribution relative to energy distributions of frequency components in a local neighborhood of the tone characteristic component and to energy distributions of frequency components in the block and the noise characteristic components being components other than the tonal components.

50. A signal recording medium as set forth in claim 49, wherein the tone characteristic information includes position information on the frequency base of the tone characteristic component.

51. A signal recording medium as set forth in claim 49, wherein the tone characteristic component information includes numeric information within a predetermined range of the tone characteristic component.

52. A signal recording medium as set forth in claim 49, wherein at least the noise characteristic component information of the tone characteristic component information and the noise characteristic component information includes normalization coefficient information and quantization accuracy information.

53. A signal decoding method for an encoded signal, comprising the steps of:

decoding a first signal consisting of tone characteristic components to generate a first decoded signal, each tone characteristic component having a sharp energy distribution relative to energy distributions of frequency components in a local neighborhood of the tone characteristic component and to energy distributions of frequency components in a time block;

decoding a second signal consisting of noise characteristic components to generate a second decoded signal, the noise characteristic components consisting of components other than the tone characteristic components; and carrying out synthetic inverse transform processing to synthesize the first and second decoded signals to implement inverse transform processing thereto, or synthetic inverse transform processing to respectively inversely transform the first and second decoded signals to synthesize them.

54. A signal decoding method as set forth in claim 53, wherein the step of synthetic inverse transform processing carries out synthesis or inverse transform processing on the basis of position information on the frequency base of the tone characteristic component.

55. A signal decoding method as set forth in claim 53, which includes a step of carrying out separation between the first signal and the second signal on the basis of numeric information within a predetermined range of the tone characteristic components.

56. A signal decoding method as set forth in claim 53, wherein at least the step of generating the second decoded signal of the step of generating the first decoded signal and the step of generating the second decoded signal carries out inverse quantization and release of normalization with respect to an inputted signal on the basis of normalization information and quantization accuracy information.

57. A signal decoding method as set forth in claim 53, wherein the encoded signal is audio signal.

58. A signal decoding apparatus for encoded signals, comprising:

first decoding means for decoding a first signal consisting of tone characteristic components to generate a first decoded signal, each tone characteristic component having a sharp energy distribution relative to energy distributions of frequency components in a local neighborhood of the tone characteristic component and to energy distributions of frequency components in a time block;

second decoding means for decoding a second signal consisting of noise characteristic components to generate a second decoded signal, the noise characteristic components consisting of components other than the tone characteristic components; and synthetic inverse transforming means for carrying out synthetic inverse transform processing to synthesize the first and second decoded signals to implement inverse transform processing thereto, or synthetic inverse transform processing to respectively inversely transform the first and second decoded signals to synthesize them.

59. A signal decoding apparatus as set forth in claim 58, wherein the synthetic inverse transform means carries out synthesis or inverse transform processing on the basis of position information on the frequency base of the tone characteristic component.

60. A signal decoding apparatus as set forth in claim 58, which includes separating means for carrying out separation between the first and second signals on the basis of numeric information within a predetermined range of the tone characteristic components.

61. A signal decoding apparatus as set forth in claim 58, wherein the first decoding means and the second decoding means include:

means for carrying out inverse quantization and releases of normalization with respect to an inputted signal on the basis of normalization information and quantization accuracy information.

62. A signal decoding apparatus as set forth in claim 58, wherein the encoded signal is audio signal.

* * * * *

UNITED STATES PATENT AND TRADEMARK OFFICE
CERTIFICATE OF CORRECTION

PATENT NO.: 5,717,821
DATED: February 10, 1998
INVENTOR(S): KYOYA TSUTSUI ET AL.

It is certified that error appears in the above-identified patent and that said Letters Patent is hereby corrected as shown below:

On the title page, item [54], and column 1:
In the title, please change "SIBNAL" to --SIGNAL--.

Signed and Sealed this

Eleventh Day of August 1998

*Attest:*

*Attesting Officer*

BRUCE LEHMAN
*Commissioner of Patents and Trademarks*